(12) United States Patent
Mura Yañez

(10) Patent No.: US 11,891,175 B2
(45) Date of Patent: Feb. 6, 2024

(54) SYSTEM FOR PERFORMING MULTIPLE POSSIBLE COMPLEX TASKS ON WORK SITES USING UNMANNED AERIAL DEVICES

(71) Applicant: Miguel Angel Mura Yañez, Santiago (CL)

(72) Inventor: Miguel Angel Mura Yañez, Santiago (CL)

(73) Assignee: Miguel Angel Mura Yañez, Santiago (CL)

( * ) Notice: Subject to any disclaimer, the term of this patent is extended or adjusted under 35 U.S.C. 154(b) by 575 days.

(21) Appl. No.: 17/048,907

(22) PCT Filed: Apr. 17, 2019

(86) PCT No.: PCT/CL2019/000017
§ 371 (c)(1),
(2) Date: Oct. 19, 2020

(87) PCT Pub. No.: WO2019/200497
PCT Pub. Date: Oct. 24, 2019

(65) Prior Publication Data
US 2021/0155344 A1    May 27, 2021

(30) Foreign Application Priority Data
Apr. 18, 2018   (CL) ..................................... 999-2018

(51) Int. Cl.
*B64C 39/02* (2023.01)
*B64D 1/18* (2006.01)
(Continued)

(52) U.S. Cl.
CPC .............. *B64C 39/024* (2013.01); *B64D 1/18* (2013.01); *E04B 1/35* (2013.01); *G06Q 50/08* (2013.01);
(Continued)

(58) Field of Classification Search
None
See application file for complete search history.

(56) References Cited

U.S. PATENT DOCUMENTS 11,235,890 B1 * 2/2022 Dahlstrom .......... B05C 11/1005
2016/0196751 A1 * 7/2016 Jarrell ..................... B64F 1/362
340/971
(Continued)

FOREIGN PATENT DOCUMENTS

WO    WO 2016/198775 A1    12/2016

OTHER PUBLICATIONS

International Search Report for related International Application No. PCT/CL2019/000017; dated Aug. 6, 2019; (3 pages).
(Continued)

*Primary Examiner* — Jelani A Smith
*Assistant Examiner* — Davin Seol
(74) *Attorney, Agent, or Firm* — K&L Gates LLP

(57) ABSTRACT

The present disclosure relates to a system that comprises: a control station intended to be operated; an unmanned aerial vehicle for multiple tasks (UAM) which is supported, by unmanned aerial devices (UAV), unmanned ground vehicle (UGV), and by a centralised mobile reel unit which feeds cables and hoses for supplying multiple additive and subtractive fluids (e.g. paint, air suction, etc.) and for charging power; wherein the cables and hoses comprise a device that makes it possible to predict trajectories, without interfering with flight maneuvers or the environment. The UAM comprises a robotic arm with specific tools that make it possible, for example, to paint fences, as well as a device that allows it to be attached to various surfaces.

14 Claims, 19 Drawing Sheets

(51) Int. Cl.
  *E04B 1/35*   (2006.01)
  *G06Q 50/08*  (2012.01)
  *G08G 5/00*   (2006.01)
  *B64U 50/34*  (2023.01)
  *B64U 101/00* (2023.01)

(52) U.S. Cl.
  CPC .......... *G08G 5/0069* (2013.01); *B64U 50/34* (2023.01); *B64U 2101/00* (2023.01)

(56) References Cited

U.S. PATENT DOCUMENTS

| | | |
|---|---|---|
| 2016/0371984 A1 | 12/2016 | MacFarlane et al. |
| 2017/0278030 A1 | 9/2017 | Pettersson et al. |
| 2017/0345320 A1 | 11/2017 | Aphek et al. |
| 2019/0106212 A1* | 4/2019 | Furukawa ............ B65H 59/384 |
| 2019/0256207 A1* | 8/2019 | Nohmi .................. B64C 37/02 |
| 2020/0283144 A1* | 9/2020 | Andeweg ............... B64C 25/34 |
| 2021/0138281 A1* | 5/2021 | Nohmi .................... B64D 1/16 |

OTHER PUBLICATIONS

Written Opinion for related International Application No. PCT/CL2019/000017; dated Aug. 6, 2019; (5 pages).

* cited by examiner

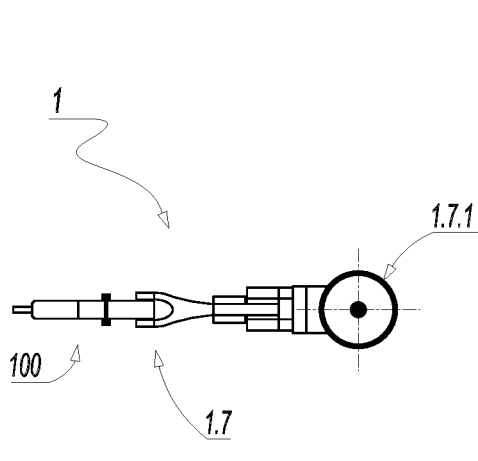
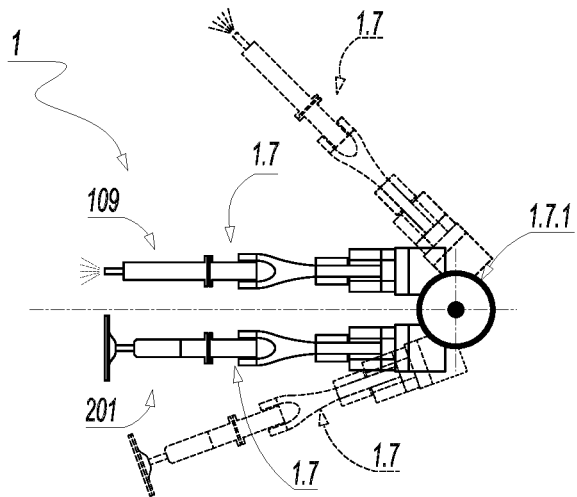
*Fig. 4*  *Fig. 5*
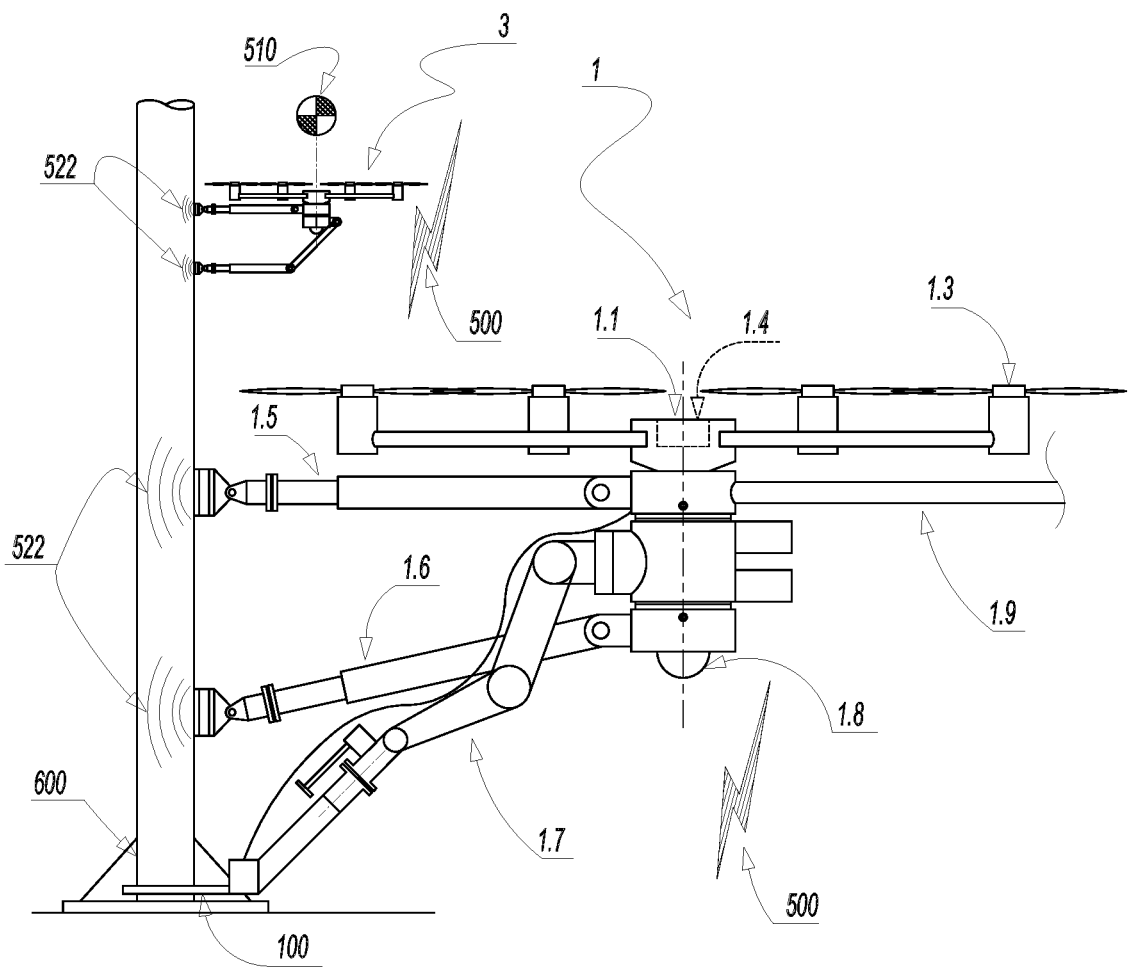
*Fig. 6*

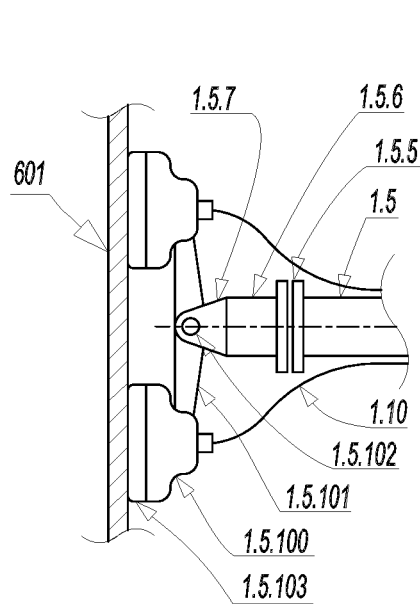
Fig. 17
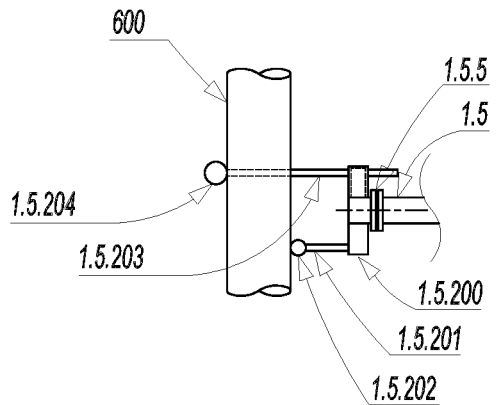
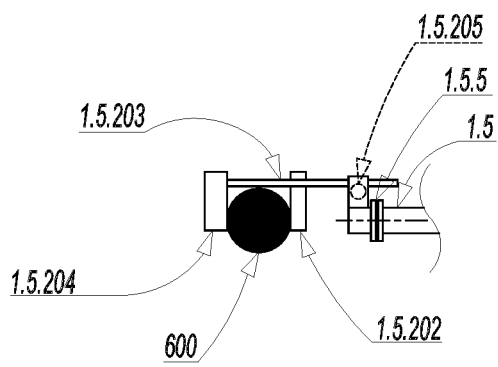
Fig. 18
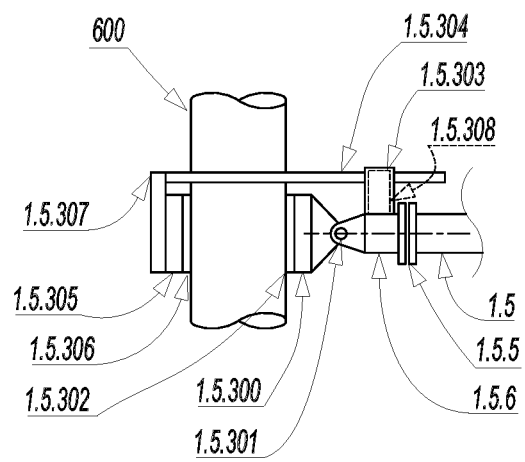
Fig. 19

SYSTEM FOR PERFORMING MULTIPLE POSSIBLE COMPLEX TASKS ON WORK SITES USING UNMANNED AERIAL DEVICES

SUMMARY

In industry it is necessary for multiple possible complex tasks to be performed on work sites (land-air-sea), and for this to be carried out in a safe manner, increasing execution and flight times, while allowing accuracy and stability. The invention relates to a system (1000) that comprises: a control station (1001) intended to be operated; an unmanned aerial vehicle for multiple tasks (UAM) which is supported, by unmanned aerial devices (UAV), unmanned ground vehicle (UGV), and by a centralised mobile reel unit (700) which feeds cables and hoses for supplying multiple additive and subtractive fluids (e.g. paint, air suction, etc.) and for charging power; wherein the cables and hoses comprise a device that makes it possible to predict trajectories, without interfering with flight maneuvers or the environment. The UAM comprises a robotic arm with specific tools that make it possible, for example, to paint fences, as well as a device that allows it to be attached to various surfaces.

Descriptive Memory

The present invention application system (1000) refers to solving a multiplicity of tasks at height, which mainly comprises an autonomous unmanned aerial vehicle for multiple tasks (UAM) and autonomous unmanned in flight equipment (UAV). The tasks are so diverse, by way of illustrative and non-limiting example; devastate a surface, clean it of dust and apply paints. The tasks are solved in complex structures on a certain work in air, land, sea or underwater (e.g. moving vehicle, moving structure, building, building, structure, urban furniture, home, aeronautical hangar, shipyard, etc.) and the system is transported to this to solve an eventual task or to settle in it to live with said work and perform periodic tasks. Then, it consists of at least one main UAV team, a set of support UAVs, other unmanned ground vehicle UGV, equipment and a multiplicity of devices that are coupled to the main air vehicle. Certain UAVs include at least one site adapter device that stabilizes the flight at the time of solving these tasks, making the maneuver more coordinated and precise. While the main UAV, the UAM, has at least one robot arm that allows to perform extremely complex, fast and precise tasks. To carry out the tasks, it requires a supply, following the previous example, it charges energy, power and paints. Then, the system has a continuous supply method from the ground and/or by air, allowing greater flight autonomy and continuity of the task. The field of application of the invention therefore belongs to UAV (unmanned aerial vehicle).

BACKGROUND

Today there are a large number of tasks that involve a risk for workers or people at home, the trend is to reduce tasks at height. In the construction of buildings, it implies great costs for companies that hire personnel who perform tasks at height, they imply hiring special insurance. Besides, tasks at height imply diverting the logistics that occur below them, for example, painting braced structures on public roads means diverting pedestrians and diverting traffic. These traffic detours mean costs for free traffic on large avenues, the municipality and the city. When cleaning structures, bus stops imply discomfort for passers-by and dangers for those workers who can slip from stairs during such maintenance. In building construction, workers are put at risk, for example, by dusting exterior concrete walls so that paint can be added later. In the buildings already delivered there are various periodic maintenance tasks, for example, the cleaning of glass facades where the cleaning crew as the passerby is endangered.

There are various tasks that involve great dexterity and complexity of the maneuver, whether it is applying a paint, cutting, drilling, sucking up dust, applying water under pressure, bucking tree branches on the road, etc.

At present, there are UAV systems that allow painting surfaces in height, this is the case of Systems and methods for unmanned aerial painting applications US 20160082460 and Automatic painting system with drone, user interface and computer vision US20170259920A1.

However, they are restricted to frontal attack painting, that is, perpendicular to the structure, and to solve flat surfaces, that is, they have great facility to paint a large area in one direction, but they do not solve the painting of sharp face vertices between two beams or profiles, structures that have braces, reinforcements and beams, complex structures, palisade structures, where the tool must move and enter spaces that require a lateral or perpendicular oblique attack with respect to the main surface. For example, structures that have crossbars in the form of "X" with "L" profiles, current systems cannot paint on the edges that are not visible from the outside. They also do not solve the painting of conical trunk surfaces since the painting tool is not suitable for such surfaces. As for complex surfaces, they do not have good control, for example, aircraft wing or aerodynamic surfaces imply good control of both frontal attack and superior maneuvering.

Also, they do not consider the various tasks involved in painting, for example, when you do maintenance on a structure, you must grind the rusted surface area, or do a general cleaning due to environmental conditions, dust, layers of earth, etc. In the case of street lighting poles, they are on grass, sand, earth and concrete, for which previous painting works are necessary. Just thinking about cutting the grass at the base of the lighting post flange, the maneuvers around the flange are complex since the analysis of the geometry to be intervened must be considered and then surround with the tool without the maneuver affecting the tool or the equipment.

Such current UAVs or equipment too, in the case of painter UAVs, tend to waste paint and are only designed to paint with horizontal and/or vertical trajectories. Covering an object completely, especially if it has complex contours, requires deep movements and lateral movements. The use of a wrist is significant, as it is often necessary to maneuver an operator to tilt a certain tool in a particular way to achieve a purpose on a highly curved surface or that is behind one that impedes normal reach.

Likewise, the UAVs that irrigate buildings, have not resolved how the supply hose is unwinding as required to reach a certain height, entanglements are observed that produce risks of the operation.

There is still a need in the industry for various work at height, to perform more stable, complex, precise maneuvers with a high degree of autonomy, an equipment that allows various previous tasks and tools that manage to provide a solution, in order to reduce intervention times in the places where the task or work is carried out.

OBJECTIVES OF THE INVENTION

The purpose of the present invention application refers to an equipment that allows reducing the execution time of tasks at height, reducing the accident rate of operators in various industries associated with construction or people at home. The task, by way of illustrative and non-limiting example, such as; painting of complex surfaces, braced structures, and pre-tasks, surface ravaging, dust cleaning, etc. A great advantage is an equipment that also solves the previous tasks, delivering a comprehensive and complete service. By having fixing systems to structures of the work, it allows the turbulence of the flight to be minimized and thanks to the fact that it has at least one arm of the robot type (6 axes of freedom), such as the KUKA robots, which allows to perform very complex and precision complemented with a multiplicity of tools that are coupled and/or connected to it and manage to efficiently perform a multiplicity of tasks. A more stable and precise maneuver, allow the process of any task be with less total energy that is expended; and improve quality, in turn, resulting in a reduction in material and labor costs. In the embodiments where the supply is carried out by cable, it has a method and devices that allow greater autonomy and continuity without the cable becoming entangled and allows overcoming obstacles in height, notably speeding up the tasks of the work. Embodiments that contemplate supply from a vehicle. Embodiments, which may be installed in a building in progress or already built, in the first one it allows significant advances in the embodiments of works that require maintenance and in the second advances as an equipment that lives together with the work responding to various tasks constantly. These characteristics reduce time at the place where the task is carried out, thereby reducing logistics and operating costs. Significant advances on progress and productivity of a work. Advantage that is direct over a company that provides these services and advantage to reduce problems in the company or entity where the task is carried out.

BRIEF DESCRIPTION OF THE DRAWINGS

Other characteristics and advantages of the invention will become apparent from the following description of its preferred embodiments, given solely by way of illustrative and non-limiting example, with reference to the accompanying drawings, in which:

FIG. 4: illustrate a top section view "A", where a robot arm (1.7) of the UAM (1).

FIG. 5: illustrate a top section view "A", where two robot arms (1.7) are seen in angular movements with respect to the UAM (1).

FIG. 6: illustrate a side view, where the UAM (1) and the origin UAV (3) are attached to the structures (600), where the UAM (1) is executing a task in the lower area of a structure (600).

FIG. 17: illustrate a side view of the device for fixing a suction cup (1.5.100).

FIG. 18: illustrate a side view, of the device for fixing to the structure by means of lever fixing, attachment (1.5.200).

FIG. 19: illustrate a side view of the device for fixing to the structure by means of fixing the press (1,5,300).

DETAILED DESCRIPTION

Figure 1:
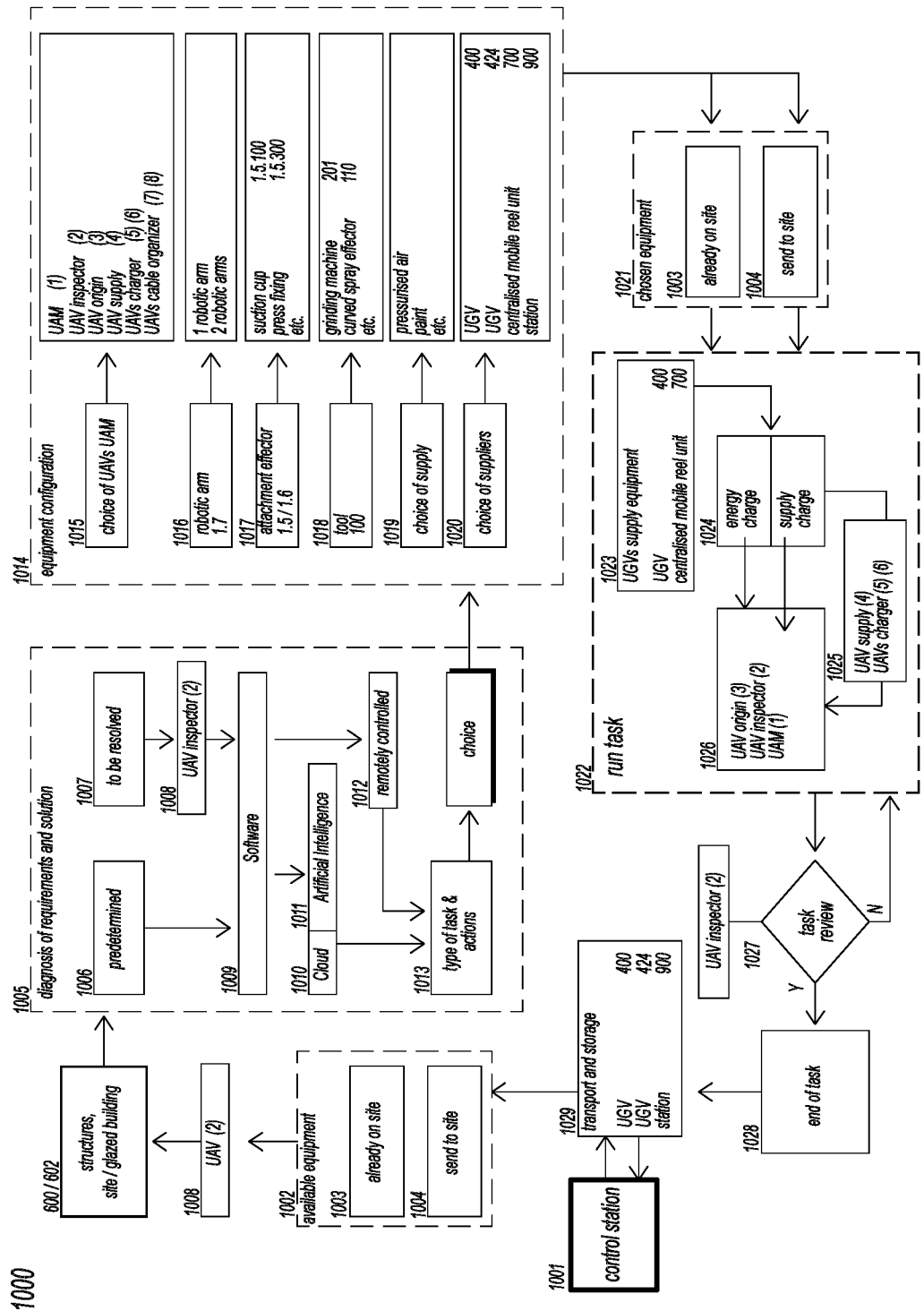
FIG. 1: is a workflow diagram of the system, as it operates from the control station (1001), of the following invention.

In the following detailed description, various example embodiments of a system (1000) will be described in detail.
How this system works.
Control, communication, storage and decision making.

In these embodiments, an UAV operator can remotely direct or pilot an UAV to travel close to a structure, and control the connected supply subsystem to precisely perform a task. In these embodiments, the skill of the operator controlling the UAV is important because the UAV must be kept at an optimal distance from the structure so that the task can be optimally performed while avoiding damaging the arm or equipment components.

In other embodiments of the present disclosure, it can be controlled automatically by a programmable computer through a software application. In these embodiments, a UAM can include sensors that are capable of determining a precise location of an UAV with respect to a structure. A programmable computer can operate a UAV to fly along a predetermined flight path while maintaining a precise UAV position relative to the structure by automatically adjusting the UAV's flight control elements in response to changing wind conditions and temporarily positioned using the removable fixation device. In these embodiments, a programmable computer, based on the location information, can also control the delivery system attached to the UAV to accurately apply additive fluids or subtractive fluids to the job site in the desired manner.

The equipment that makes up the system (1000), communicate by means of first emission signals, second reception signals and third control signals, wireless transmission (500), either with each other or with the control station (1001), remotely controlled (1012), UGV (400), centralised mobile reel unit (700) and station (900). Since they comprise a multiplicity of sensors, GPS, LIDAR light detection and measurement units, and antennas that deliver first and second signals than the data and image transmission modules (not shown), generally located in the UAV control unit. and ground equipment, controller (1.4) and controller (701.1) respectively. This communication is processed by Software (1009) and/or stored in the Cloud (1010) and/or assisted by Artificial Intelligence (1011). Decision-making, as already mentioned, can be done by an operator using mobile manual control devices; Smartphones, Tablets, Notebooks, and Joystick, remotely controlled (1012) through Software (1009) and/or Artificial Intelligence (1011). Both the Software (1009) consists of routines according to tasks or that the Cloud (1010) already has and they are downloadable to perform new maneuvers. Likewise, from Software (1009) new maneuvers can be uploaded to Cloud (1010).
Supplies.

In yet other embodiments of the present disclosure, a system (1000) includes a UAV and supply tanks that are connected to the UAM (1), specifically close to the robot arm (6 axes of freedom) and connected to the tool and configured to remain on the ground while UAV is in flight. In these embodiments, one or more pumps can be used to supply and/or suck a certain fluid that is held in the supply reservoir to a tool. There may be larger, heavier, land-based pumps that are connected to the supply reservoir that perform the task of conducting the fluid to the UAM (1) in the air, and a smaller, lighter pump that is carried by itself. UAM (1) or another UAV that supports it close to it and also in flight, which provides the optimal pressure for fluid delivery from the nozzle. In these embodiments, fluid is delivered to the mouthpiece through an umbilical cord that can include one or more flexible tubes. In some embodiments, each of the flexible tubes can supply different fluids to nozzle, on the UAM (1). In other embodiments, an umbilical may optionally include a lightweight power cord to supply power (electrical) to the UAV and/or fluid supply subsystem, although in most cases the necessary power to operate the UAV can be provided and/or the fluid subsystem by a battery that is carried on board the UAV.

In some embodiments of the present disclosure, system (1000) includes a UAM (1) and a supply reservoir that carries at least one other UAV while the UAM (1) is in flight, with no wire connection to the ground. In these embodiments, the UAM (1) is supported by at least one UAV that carries the supply that provides the optimal pressure and/or suction for the delivery of additive fluid as subtractive fluid from the supply reservoir of certain fluid that is conducted to the tool, on the UAM (1). In these embodiments, UAM (1) executing the task is continuously recharged by another UAV in flight. Likewise, the UAV that carries the fluid supply is supported by another UAV that is coupled in flight and recharges it energetically. The energy performance, load weight ratio and energy use in a UAV that only transports the energy recharge, is greater than a UAM and UAV equipment that transports the supply. This UAV, which recharges other equipment in flight, is recharged in a vehicle or station on the ground, either by means of induction or by contact. In-flight delivery of the supply allows more time in flight to perform tasks in UAM (1) and UAV that transport the fluid supply.

In some embodiments of the present disclosure, system (1000) includes a UAM (1) that has a delivery reservoir that carries at least one UAV while the UAM (1) is in flight. In these embodiments, the UAM (1) includes a smaller and lighter pump carried by the UAV that provides the optimum pressure and/or suction for delivery of additive fluid as subtractive fluid from the supply subsystem tool. In these embodiments, a delivery reservoir can be detached from the UAV so that empty reservoirs can be exchanged for full reservoirs relatively easily. Because the fluid chamber and the amount of fluid it can store in these embodiments are necessarily limited due to the lifting capacity of the UAV, these embodiments are ideal for smaller tasks where the number of refills required is limited, as that replacement of a supply reservoir would normally be performed by a human UAV operator in the transport vehicle, on-site station or simply on the ground. In these embodiments, the tube supplying the additive fluid as subtractive fluid from the supply reservoir to the nozzle of the fluid supply subsystem, too, it is preferably separated from the UAM and the UAV that supports it, so that different fluids with different characteristics can be applied without contamination between them.

In other embodiments of the present disclosure, the system (1000) provides a UAM (1) and the UAV equipment, which includes a cable-carrying equipment that is installed in a work which is in process or is already finished. The cable management equipment allows to deliver continuous supply. Likewise, it can be remotely controlled by an operator or activated by an application software. This cable-carrying equipment has a rail that allows greater perimeter reach to the work in order not to entangle cables to the equipment in flight. In addition, it has a station to store UAVs and cables.

In other embodiments of the present system disclosure (1000), they provide a UAM (1) and the UAV equipment, which includes a cable-carrying equipment that is installed in a work which is in process or is already finished. In this station UAVs can be recharged energetically by induction. Configuration of UAV.

Because the UAV equipment that makes up the system (1000), they have different amounts of rotors since they perform different tasks and support different weights, the UAM (1) is of an eight-rotor "octo-copter" type, but can have four rotors ("quadruple helicopter"). Other UAVs suitable for use with other embodiments may have a different number of rotors, such as six rotors ("hexacopter"). Generally speaking, if the size of the rotors is equal, a UAV with more rotors is capable of producing more lift, but it also requires more energy to power the rotors. In the example embodiments of UAM the applications described herein, a UAV must generate sufficient lift to allow both itself and any payload it may carry to be carried in the air. Considerations of weight and lift such as these are normal flight engineering problems that are well known to those of skill in the art, and will not be explained in more detail in this document.

DETAILED DESCRIPTION ACCORDING TO FIGURES

To carry out the detailed description of the preferred embodiment of the device of the invention, continuous reference will be made to the Figures of the drawings, of which FIG. 1 is a flow diagram of how the invention system (1000), from a the control station (1001) or company carries out a transport and storage (1029) which comprises two instances of control station (1001), one where the equipment is transported in a UGV (400) to a structure (600) or it is transported to a station (900) and lives in a glazed building (602). The equipment available equipment (1002) logically has two instances, one that is already on site (1003) and another that is send to site (1004). UAV (1008), the inspector UAV (2) is sent to work, both the structure (600) and the glazed building (602). The census information and images probed by the inspector UAV (2) are evaluated and processed by means of diagnosis of requirements and solution (1005), then a solution can be a known, predetermined (1006) or there are no precedents of known requirements and therefore which there is no known solution, to be resolved (1007). This diagnosis is processed and assisted by Software (1009) that evaluates, and the solutions are shared and compared with other experiences or cases stored in the Cloud (1010) that is processed by Artificial Intelligence (1011). Likewise, the requirements solutions can be carried out by an operator through remote control via remotely controlled (1012). These routes must define types of tasks and actions (1013) with which the equipment configuration (1014) suitable for carrying out the task in a given work will be carried out. The equipment configuration (1014) implies a choice of UAV (1015), choice of quantity and type of robotic arm (1016), choice of attachment effector (1017), choice of final effector (1018), choice of supply (1019), choice of suppliers (1020). Once the chosen equipment (1021) has been defined, both for the equipment already on site (1003) and/or to be send to site (1004), run task (1022) and supplies are delivered by UGVs supply equipment (1023) are carried out from a UGV (400) or centralised mobile reel unit (700). The energy charge/supply charge (1024) constantly supplies, UAM/inspector and origin UAVs (1026) and also supported by charge/supply UAVs (1025). Task review (1027) review is performed by the inspector UAV (2), if it is not under "N" compliance, run task (1022) must be performed again together with Software (1009), and if it is under "Y" compliance, it is terminated, end of task (1028) whereby transport and storage (1029) is given and/or returned to control station (1001) as appropriate. The control station (1001) should be understood as the control instance from any enabled point, from a company, home, mobile device, remote manual control, etc.

Figure 2:
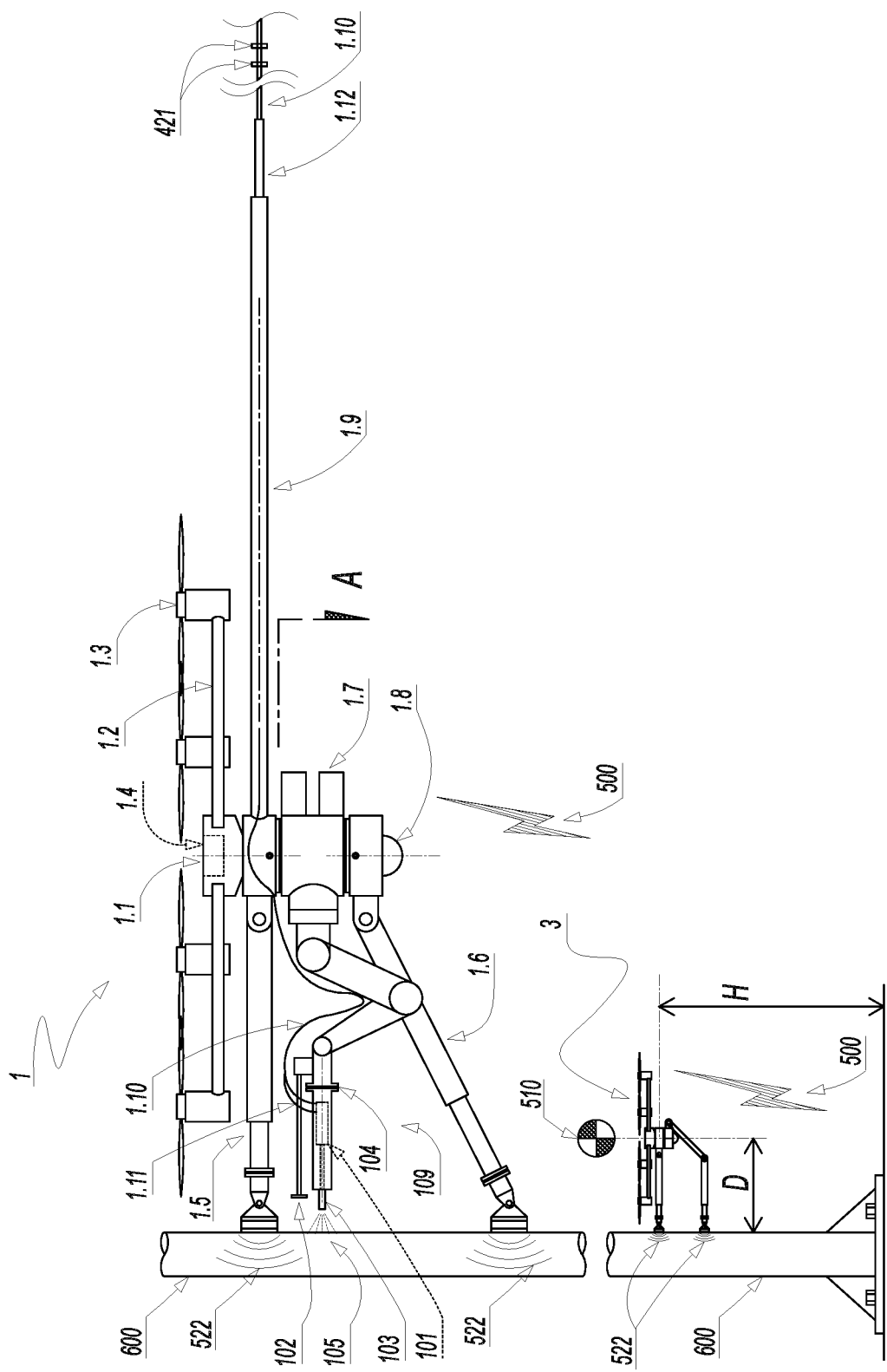
FIG. 2: illustrate a side view, where the UAM (1) and an origin UAV (3) are attached to structures (600), where the UAM (1) is executing a task, of the following invention.

FIG. 2, illustrate the system (1000), comprises the UAM (1) and the origin UAV (3) are attached to the work, structures (600), where the UAM (1) is executing a task, of the following invention. At least one origin UAV (3) is capable of being attached to a specific place of the work structures (600), thereby ensuring a point of reliability for flight maneuvers, maneuvers for the execution of a task and the operations of the others. UAV or associated equipment. This is achieved since the origin UAV (3) censuses its surroundings and obtains position data, such as height "H" or depth "D", said UAV emits by radio, transmitter (510), first signals, through wireless transmission (500), wireless radio, which UAM (1) will process and perform convenient maneuvers. Both teams have a fixing device, a fixing (522), that allows them to be positioned at will on structures (600). UAM has different fixing devices for which it is only illustrated here and is in no way limiting. UAV units comprise a UAM, a subsystem common to them, which is made up of a circular body (1.1), from which four arms extend from each other two arms (1.2) arranged horizontally and distributed radially around the circumference of the body (1.1) at the outer end of which there are rotors (1.3), an omnidirectional video camera (1.8), and a controller (1.4) preferably located in the center of the body (1.1). The controller (1.4) including a battery (not shown) to provide power and a wireless receiver (not shown) to receive wireless flight control signals from a ground control station control station (1001) and from the other UAVs.

UAVs to recognize their surroundings and position themselves, have a multiplicity of sensors, GPS, and a LIDAR light detection and measurement unit (not shown), with which they measure distances and determine the surface finish of the works. Which are conveniently located in each UAV. By way of illustration and not limitation, they can determine if a metal surface is oxidized. Likewise, level, flow, and pressure sensors around supply tanks monitor the capacities, delivery and performance of supplies.

In order to communicate said environment, and among the UAVs, they have a transmitter (510) through antennas (not shown), they establish a wireless transmission (500) by means of wireless data and image transmission and management modules (not shown).

Likewise, to transmit and manage power supply, UAVs have microcontrollers, RFI radio frequency emitters, DC/DC load converter modules, battery storage, emission, reception, transmission and power load management modules (not shown) from the sources. supply, preferably located close to controller (1.4) and controller (701.1) respectively.

The system (1000), the UAM (1) especially comprises at least one robot arm (1.7) robot that allows to carry out the complex maneuvers of a certain task to which the tool (100) is attached, according to the certain task, then in this figure shows a spray effector (109) which is coupled by link (104) that is conveniently easy to join for an operator or to another larger tool-carrying device. Said tool (100) comprises a pump (101) that allows the necessary pressure of additive fluids or subtractive fluids to be delivered through a conduit (1.10) to a spray nozzle (103) with necessary characteristics according to the expelled fluid (105) such as; jet, spray, etc.

The conduit (1.10) is guided wrapped and protected to a support duct (1.9) beyond the perimeter capable of the rotors (1.3) and at its end an elbow (1.12) allows adequate omnidirectional bending without strangling the cable and ensuring that it does not exist dangers due to entanglement of cables for both power supply and fluids. The power conduit (1.10) includes a ring (421) that is arranged equidistant and homogeneously along it, allowing the UAM and software to know spatial position and prevent any collision of them with UAV equipment in flight or maneuvers to order them on the ground. The maneuvers and execution of tools are monitored by a frontal camera (102) and also by the support UAVs, at least one inspector UAV (2). The UAM equipment that considers to be attached to structures (600), such as UAM (1) and the origin UAV (3) have fixing means that articulate and extend to be able to reach structures (600) by means of superior fixing, attachment (1.5) and lower attachment (1.6) which is achieved by electromagnetic clamping, a fixing (522).

Figure 3:
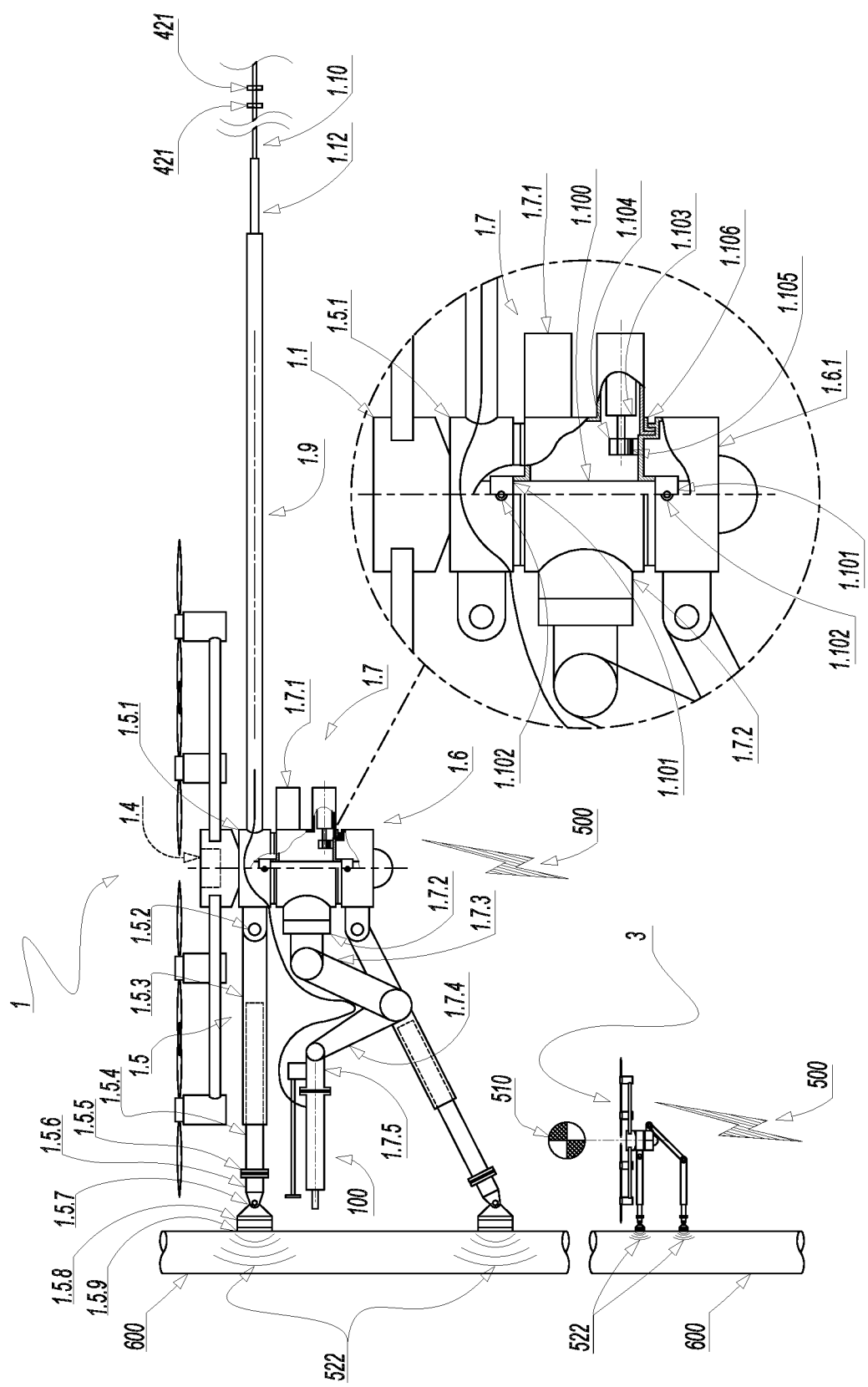
FIG. 3: illustrate a side and broken view, partially showing the interior, where the UAM (1) and the origin UAV (3) are attached to the structures (600), where the UAM (1) is executing a task, of the following invention.
Figure 7:
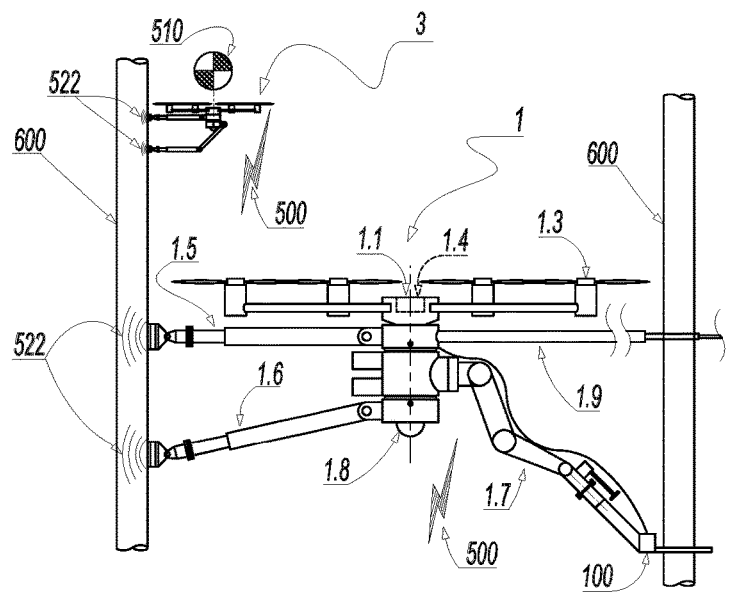
FIG. 7: illustrate a side view, where the UAM (1) and the origin UAV (3) are attached to structures (600), where the UAM (1) is executing a task on a structure (600) opposite the fixing direction.

Referring to FIG. 3, illustrate the system (1000), comprising the UAM (1) and the origin UAV (3) are attached to the work, structures (600), where the UAM (1) is executing a task, of the following invention. At least two attachments (1.5) subsystems to structures (600). Which in this embodiment works both as a fixing system and which, when articulated, works as a landing gear. This attachment (1.5) comprises a rather cylindrical body (1.5.1) from which a rotation unit (1.5.2) is located, from which a cylinder (1.5.3) capable of conveniently pivoting downwards is connected. From the inside of the cylinder (1.5.3) the piston rod (1.5.4) is extended and the joint (1.5.5) is located at its outermost end. From this joint, other fixing device are coupled according to the surface shown in FIG. 17, FIG. 18 and FIG. 19. For the purposes of this embodiment and this Figure, then after the joint (1.5.5) a body capable of absorbing impacts or shock absorbing mechanical differences, shock absorber (1.5.6), is attached to an omnidirectional ball joint (1.5.7) that allows to supply Oblique surfaces in relation to the desired horizontality of the UAV as a flexible and also articulated adapter (1.5.8) surface, is capable of adapting to structures with profiles of different geometric sections. In the flat portions of the adapter (1.5.8) an electromagnetic plate (1.5.9) is arranged that directly touches the work, structures (600). The attachment (1.5) can have another of the same parallel to it, except that the body (1.5.1) contains means to move them away from each other for the convenience of maneuvers. The mechanical technique allows today without greater effort to achieve angles or movements of the cylinder (1.5.3) in relation to the body (1.5.1) and the displacement of the piston rod (1.5.4) along it, by means of a motor of relevant torque, gears, ACME worm gears, power stroke movements also pneumatic hydraulic, etc. likewise the action of the electromagnet is known. In the same way it is the lower attachment (1.6). It can be seen, robot arm (1.7) composed of body (1.7.1), base (1.7.2), arm (1.7.3), forearm (1.7.4) and wrist (1.7.5), mainly in the latter tool (100) is attached, the range of tools that can be attached is detailed in FIG. 20. The configuration of the arm and the degrees of freedom depend on the task, ranges and the required work fields.

It can also be observed, the interior detail, where the attachment (1.5), the robot arm (1.7) and the lower attachment (1.6) are capable of turning, allowing a greater range of maneuvers and functional operations than are shown in the following figures. The rotation of the subsystems is achieved since the base bodies of each subsystem rotate around an axis and then a series of motors, gears and racks, allow the control of the bodies independently. Then, a cylindrical shaft body, shaft (1.100) is integral with the body (1.1) and at the other end to the body (1.6.1) a bolted connection (1.102) joins the bushing (1.101) allowing it to be removable respects to the shaft, among which body (1.5.1) and body (1.7.1) are arranged. Between said bodies, coaxial bushes, bushing (1.106) are arranged continuously in order to reduce friction between them, made of known self-lubricating plastic materials. In the body (1.7.1) a rotor (1.103) is coupled, which transmits the necessary power by means of a gear (1.104) to a ring gear (1.105) that is integral with the body (1.6.1), allowing convenient control of rotation. In the same way the body (1.1) with body (1.5.1) and this with body (1.7.1). Internally, the power and drive cables communicate with the controller (1.4). The mechanical technique allows today without much effort to achieve control of hundredths millimeter and high performance power through; actuators, servomotors, hydraulic motors, etc.). It is desirable that these actuators have a maintenance and lubrication door (not shown) and that they are considered in the embodiments.

Referring to FIGS. 4 and 5, both are a sectional view "A", where a robot arm (1.7) is observed in the UAM (1) of the system (1000). In particular, FIG. 5 shows two versions of the robot arm (1.7) connected to UAM (1). This combination is established by the choice of quantity and type of robotic arm (1016) and choice of final effector (1018) different tools (100). This is achieved since the body (1.7.1) has various embodiments. Within the embodiments we can achieve that an opening angle is generated between a robot arm (1.7) of one type and another. This independent angular movement between the different robot arms (1.7) is desirable since it allows different and simultaneous tasks to be carried out. Today, the mechanical technique allows to achieve the independent angular movement of each robot arm (1.7).

Collectively, FIGS. 6, 7, 8, 9, 10, illustrate system (1000), comprising the origin UAV (3) is attached to work, structures (600). While in FIGS. 6, 7 and 9 the UAM (1) is attached to the work, structures (600) by attachment (1.5) and lower attachment (1.6), in FIG. 8 it is attached to the work, structures (600) only by attachment (1.5) while in FIG. 10 it is in flight. The confidence of taking a task, maneuvering and not losing the relative or absolute position of the flight position is thanks to the fact that the origin UAV (3) is the local reference in front of the work, structures (600). the origin UAV (3) sends first signals, wireless transmission (500) through transmitter (510).

Referring to FIG. 6, shows UAM (1) performs lower tasks, since it comprises a robot arm (1.7) capable of rotating and accommodating tool (100) with the maneuvers that the robot arm (1.7) allows. Likewise, FIG. 7, the tool (100) is able to reach the opposite side.

Figure 8:
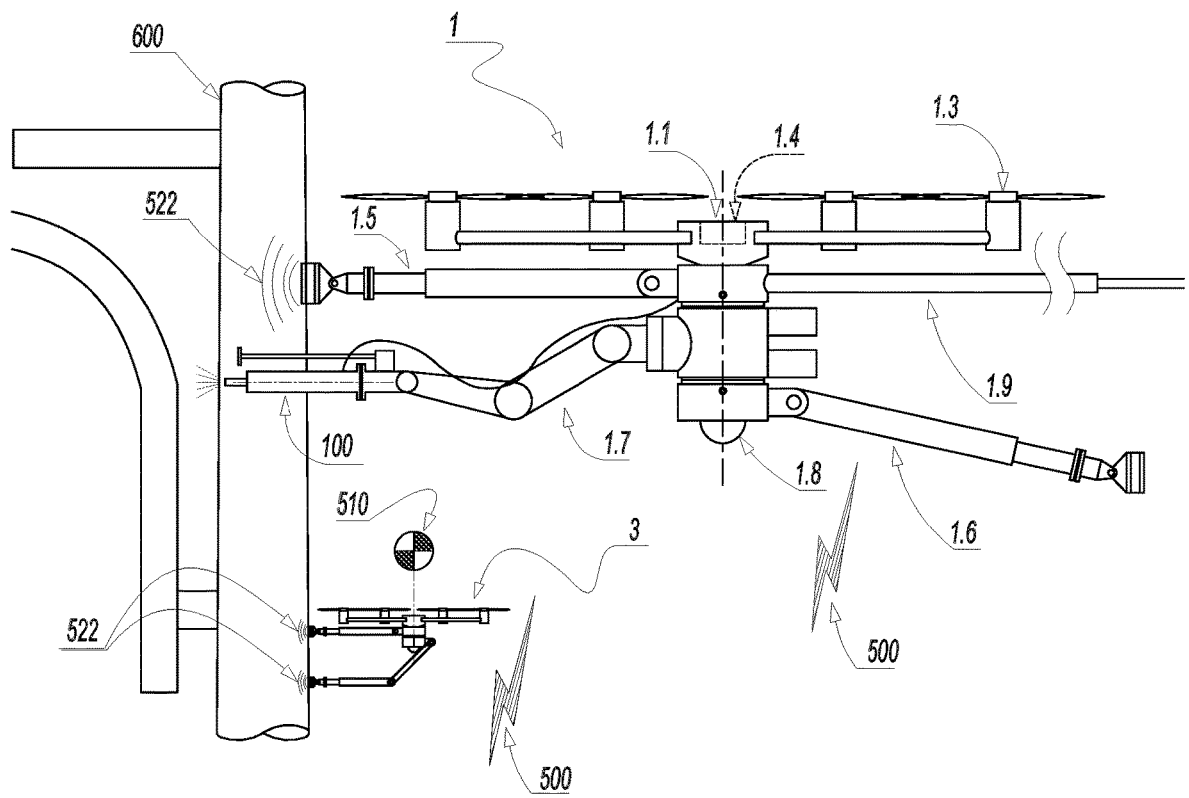
FIG. 8: illustrate a side view, where the UAM (1) and the origin UAV (3) are attached to the structures (600), where the UAM (1) is executing a task between the structures of the work, structures (600), it is also illustrated that lower attachment (1.6) are in the air.

Referring to FIG. 8, shows UAM (1) performs frontal tasks, it is attached to the work, structures (600) only by attachment (1.5), it is also shown that the tool (100) makes maneuvers between 2 structures of the work, structures (600), since it comprises robot arm (1.7) capable of rotating and accommodating curved spray effector (110) with the maneuvers allowed by the robot arm (1.7).

Figure 9:
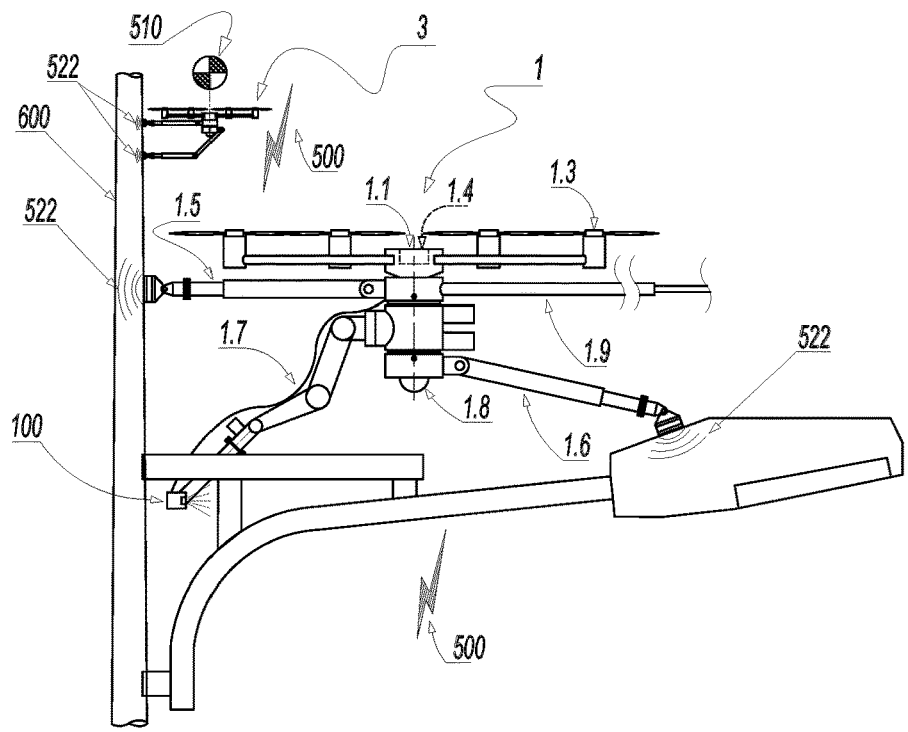
FIG. 9: illustrate a side view, where the UAM (1) and the origin UAV (3) are attached to the site, structures (600), where the UAM (1) is executing a task under itself, on structures (600), it is also illustrated that the lower attachment (1.6) is fixed on another structure (600).

Referring to FIG. 9, shows UAM (1) performs lower tasks and is attached to the work, structures (600) by lower attachment (1.6) and attachment (1.5), it is also shown that the tool (100) performs lower maneuvers between 2 structures of the work, structures (600), since it comprises a robot arm (1.7) capable of turning and accommodating the curved spray effector (110) with the maneuvers that the robot arm (1.7) allows.

Figure 10:
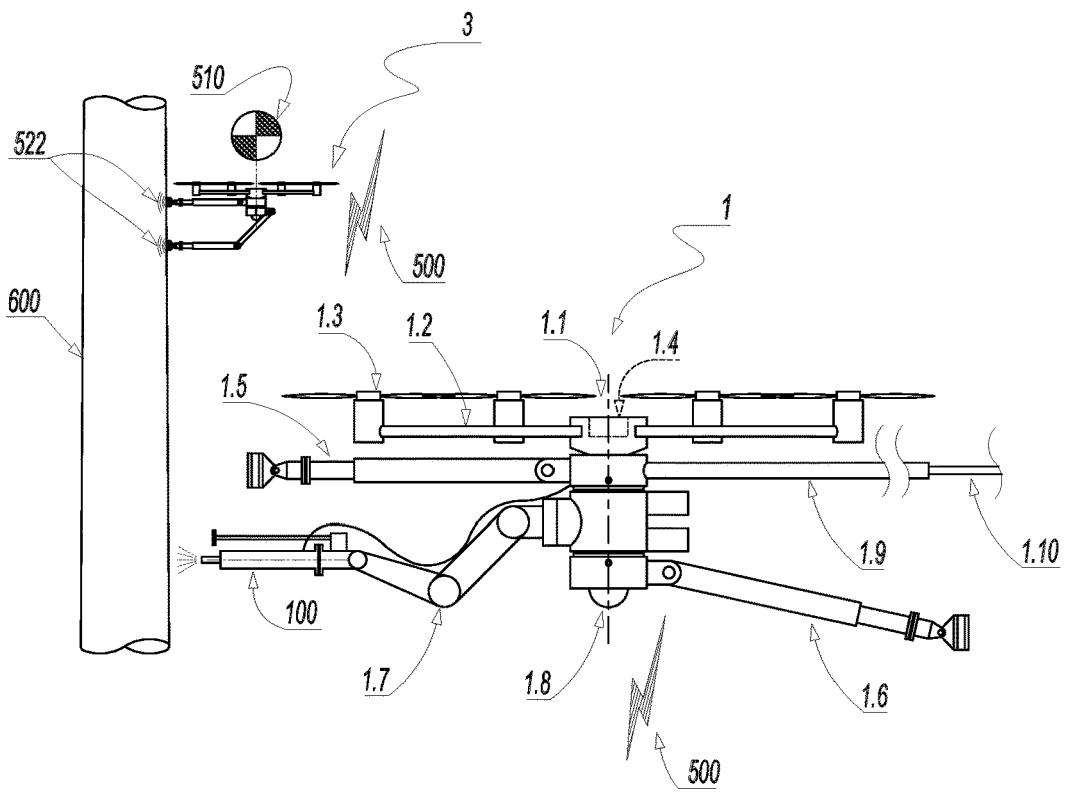
FIG. 10: illustrate a side view, where the UAM (1) is in flight in front of the site, structures (600), and is executing a task on structures (600), while the origin UAV (3) is attached on structures (600).

Referring to FIG. 10, shows that UAM (1) performs frontal tasks, it is not attached to the work, structures (600) it is in mid-flight, it is also shown that the tool (100) performs frontal maneuvers to the structure of the work, structures (600), it is shown moreover, the lower attachment (1.6) is rather horizontal, since it is capable of turning and articulating.

Figure 11:
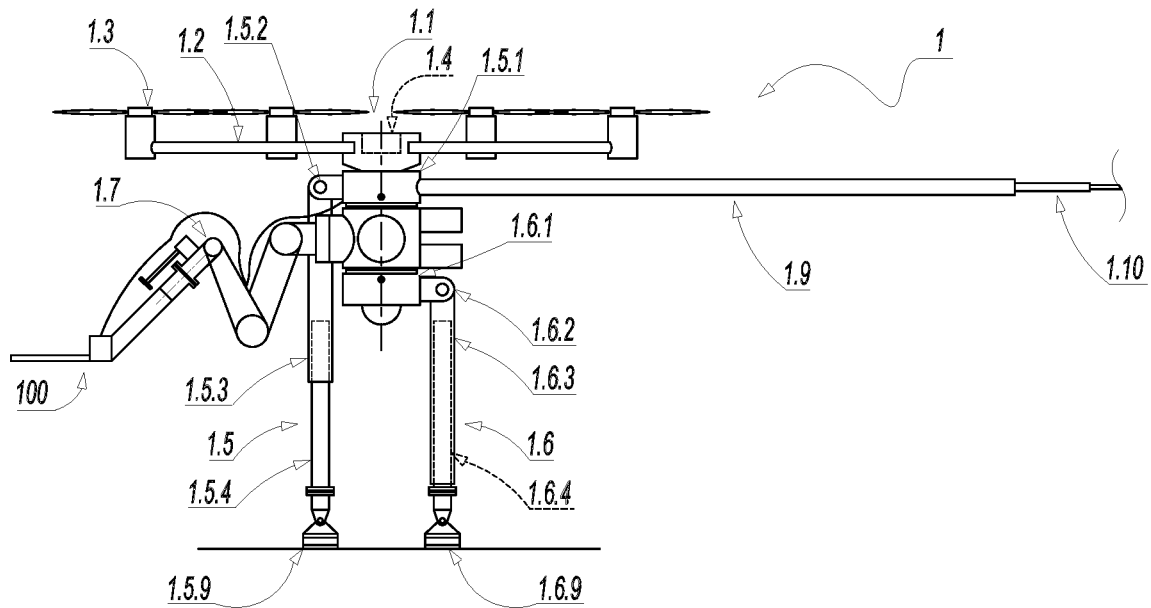
FIG. 11: illustrate a side view, where the UAM (1) is in landing mode.
Figure 12:
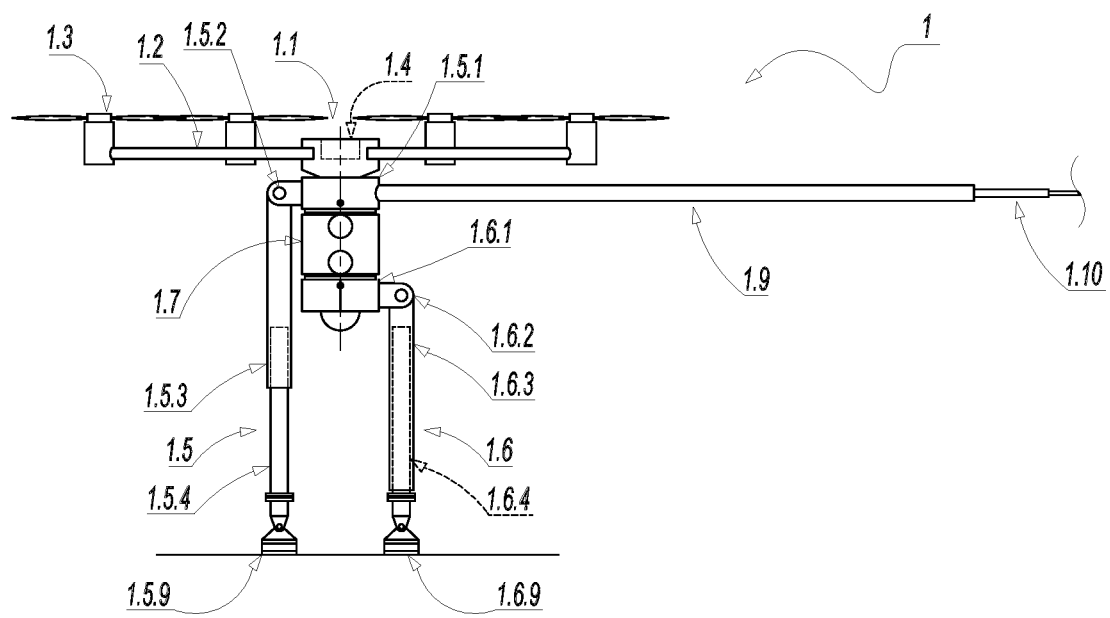
FIG. 12: illustrate a rearview, where the UAM (1) is in landing mode.

Referring to FIG. 11 and FIG. 12, show UAM (1) is in landing mode, attachment (1.5) and lower attachment (1.6) are oriented to the ground, capable of stabilizing the equipment in its entirety. This articulatory movement and extensions are accommodated to achieve a distance such that the extremities reach an equal lower distance. This is achieved since attachment (1.5) comprises a body (1.5.1) from which a rotation unit (1.5.2) is located, from which a cylinder (1.5.3) is connected capable of conveniently pivoting downwards, from the inside of the cylinder (1.5.3) the piston rod (1.5.4) is extended. The fixings to structures both; electromagnetic plate (1.5.9), suction cup (1.5.100), attachment (1.5.200), press fixing (1.5.300), allow direct support to the ground. Also for lower attachment (1.6).

Figure 13:
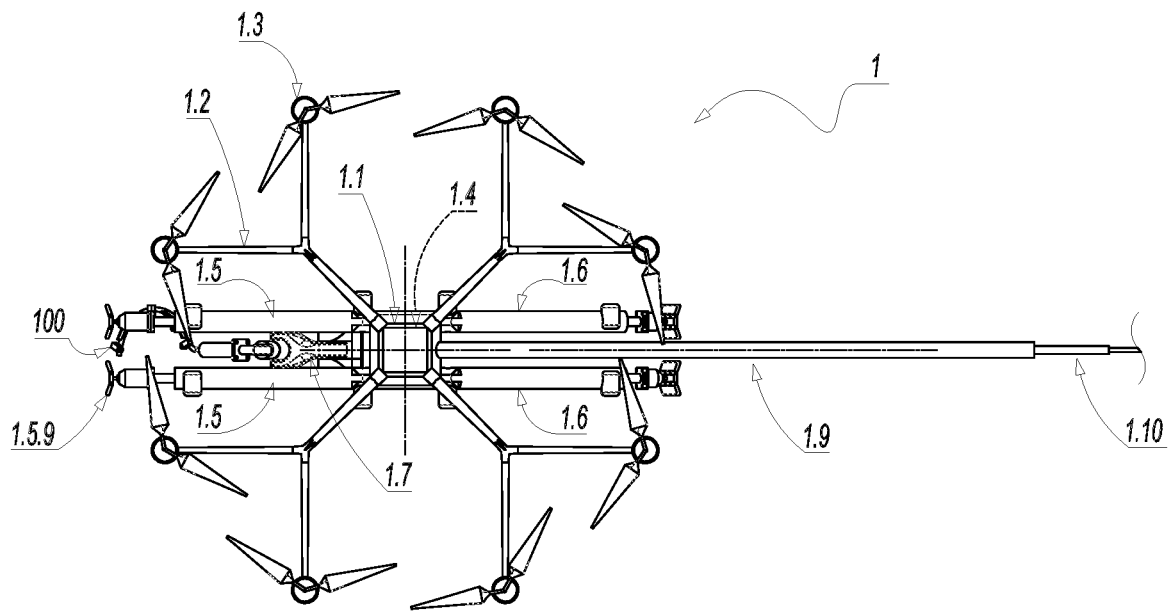
FIG. 13: illustrate a top view, where the UAM (1) is in flight mode.

Referring to FIG. 13, shows UAM (1) in top view, in flight, where the conduit (1.10) is protected and guided by support duct (1.9) beyond the capable radius that comprises the rotor (1.3) arrangement. It is also appreciated that the electromagnetic plate (1.5.9) is also beyond the tool (100).

Figure 14:
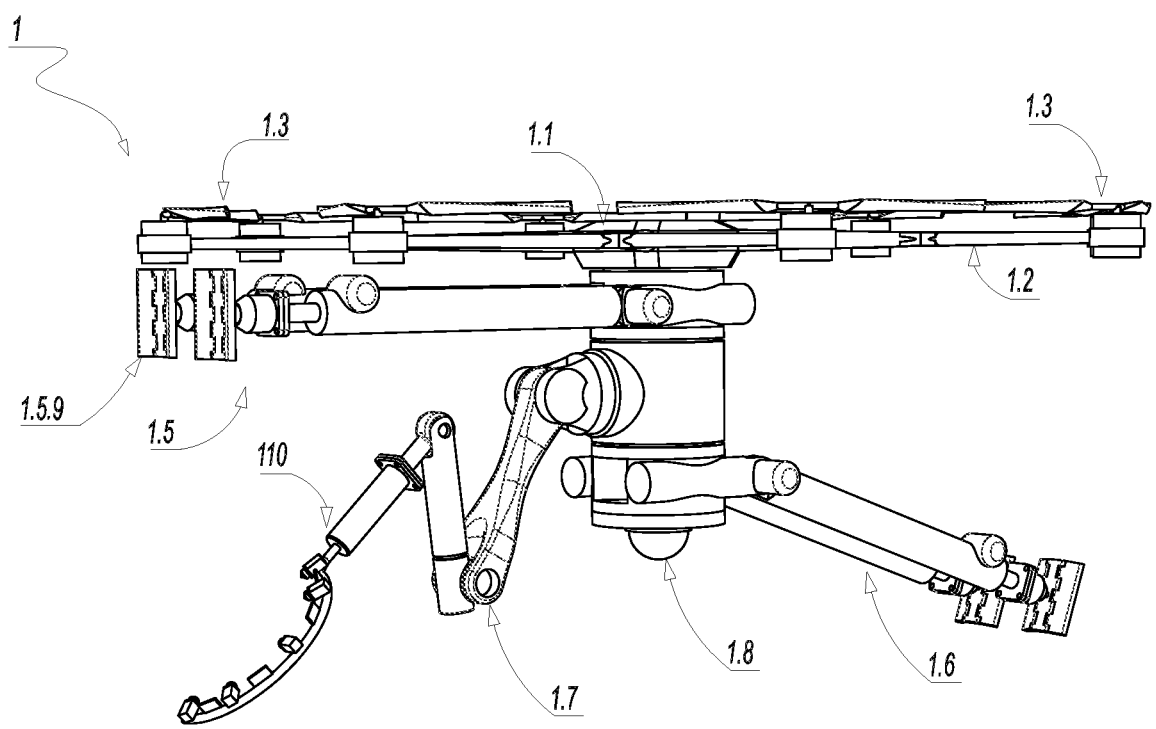
FIG. 14: illustrate a perspective view, where the UAM (1) is in flight mode.
Figure 15:
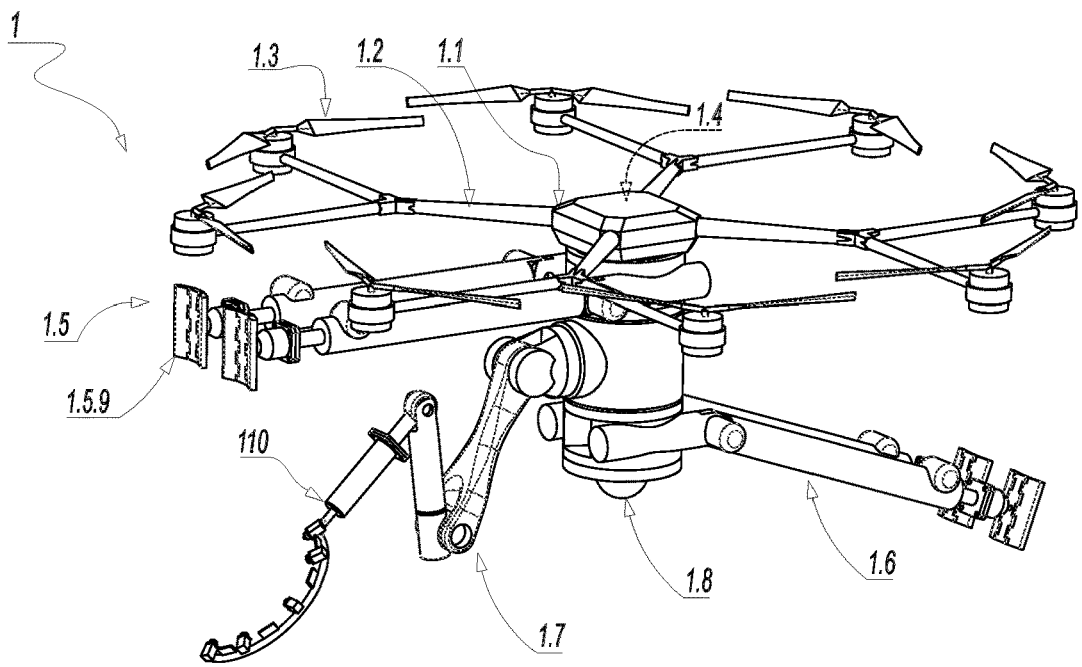
FIG. 15: illustrate a top perspective view, where the UAM (1) is in flight mode.

Referring to FIGS. 14 and 15, shows UAM (1) in perspective view, in flight. It can be seen that it has a tool for painting structures, curved spray effector (110) connected to the robot arm (1.7).

Figure 16:
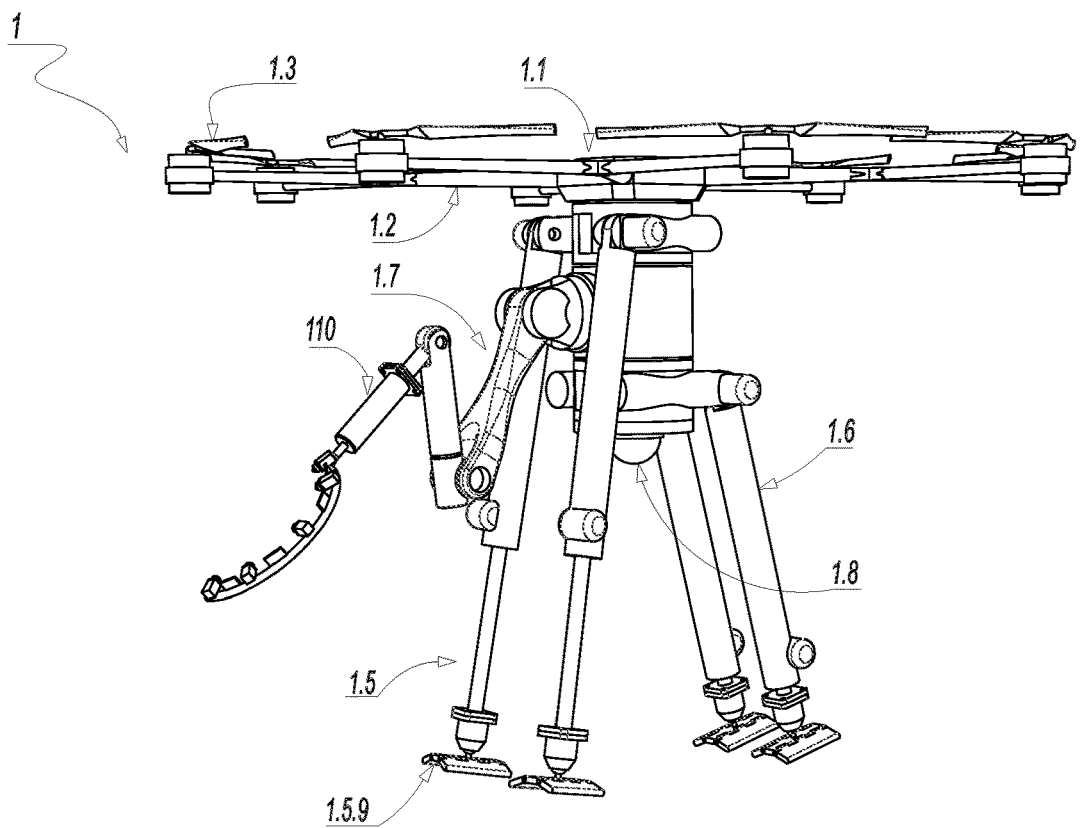
FIG. 16: illustrate a perspective view, where the UAM (1) is in landing mode.

Referring to FIG. 16, shows UAM (1) in perspective view, in landing mode. It can be seen that it has a curved spray effector (110) connected to the robot arm (1.7).

Referring to FIG. 17, shows a detail in side view, of a type of fixing to the structure, which is connected to attachment (1.5) and/or lower attachment (1.6) of the UAM (1). Then, the attachment (1.5) is connected to a suction cup (1.5.100) that is capable of fixing to glass, ceramic, glass (601), by means of a joint (1.5.5) from which a body capable of absorbing impacts is projected, shock absorber (1.5.6), from where a body is projected that covers another spherical beyond its quadrant, ball joint (1.5.7) from which two flattened portions are projected that have a perforation where the shaft (1.5.102) is housed coaxial to the latter, two more extensive flattened support portions are also projected, swingarm (1.5.101), which are joined to a conical suction cup (1.5.100) that is capable of containing air from whose perimeter a homogeneous and flexible seal body (1.5.103) which rests directly on glass (601), this subset is able to tilt and articulate your plane of action and support and absorb the differences found between the perpendicularity of the UAM (1) with respect to glass (601). The air that is in the conical suction cup (1.5.100) is extracted because the system (1000), the supply UAV (4) that have a reservoir (411) where a pump (413) is housed, said extraction is achieved through one of conduit (1.10).

Referring to FIG. 18, shows a detail in side and top view of a type of fixing to the structure, which is connected to attachment (1.5) and/or lower attachment (1.6) of the UAM (1). Then, to attachment (1.5) is connected attachment (1.5.200) that is able to be fixed to straight or frustoconical columns of different work sections, structures (600), for this it comprises a body that at one end projects rectangular section in direction aligned to the longitudinal axis of the attachment (1.5) and ends with a larger flat face where the joint (1.5.5) is connected and at the other end, lower and upper bodies are projected perpendicularly with the same rectangular section, which have threaded holes where they are staying; in the upper threaded hole a threaded cylinder a upper extension (1.5.203) that is integral and perpendicular to an upper stop (1.5.204) which also cylinder covered with non-stick material and that is capable of absorbing differences and surface texture, while in the lower threaded bore, a lower extension (1.5.201), threaded cylinder that is integral and perpendicular to the lower stop (1.5.202), in the same way, the upper stop (1.5.204).

The upper extension (1.5.203) is conveniently moved at the will of UAM (1) by means of a motor (1.5.205) which is located in the upper portion of the attachment (1.5.200). The control, power connection, wired or wireless drive, motor power and the technical characteristics to achieve that this type of fixing meets its objective in relation to the requirements of the UAM (1), the work, structures (600) and the task to be carried out, because the mechanical technique allows today without much effort to achieve.

Referring to FIG. 19, shows a detail in side view, of a type of fixing to the structure, which is connected to attachment (1.5) and/or lower attachment (1.6) of the UAM (1). Then, the attachment (1.5) is connected to a press fixation (1.5.300) that is capable of being fixed to straight or frustoconical columns of different work sections, structures (600), for this it comprises a body that is projected at one end of section rectangular in the direction aligned with the longitudinal axis of the upper landing attachment (1.5) and ends with a larger flat face where it connects to a joint (1.5.5) and at the opposite end a body capable of absorbing impacts is projected, shock absorber (1.5.6), from where a body is projected with two flattened portions that decrease in size and that have a common perforation and pin, shaft (1.5.301), coaxial to this and from this, another body that grows to a section rectangular, press fixation (1.5.300), always parallel to the work, structures (600), it is integral and covers the rectangular face with a certain thickness, non-stick surface (1.5.302), which rests directly on the work, structures (600). Also, from the shock absorber (1.5.6), it is projected perpendicularly with the same rectangular section upper body, support (1.5.303), which have a threaded hole where threaded cylinder, upper extension (1.5.304), which is more extensive that the dimensions of the non-stick surface (1.5.302) and beyond the dimensions of the work, structure (600) a perpendicular rectangular body is projected, support (1.5.307), to which another body of the same section that is attached, supports (1.5.305), followed by another body that is supportive and covers the rectangular face with a certain thickness, non-stick surface (1.5.306).

The shock absorption is achieved because the shock absorber (1.5.6), is made of a memory material, a device that can conform to springs or elastomers of a certain geometry known in the art.

On support (1.5.303) there is a motor (1.5.308) that is capable of moving, upper extension (1.5.304) conveniently at the will of UAM (1).

The thickness and material of the non-stick surface (1.5.302) and non-stick surface (1.5.306) is capable of absorbing differences in texture and work surface, structures (600) and also that the equipment does not slip.

The control, power connection, wired or wireless drive, motor power and the technical characteristics to achieve that this type of fixing meets its objective in relation to the requirements of the UAM (1), the work, structures (600) and the task to be carried out, because the mechanical technique allows today without much effort to achieve.

Figure 20:
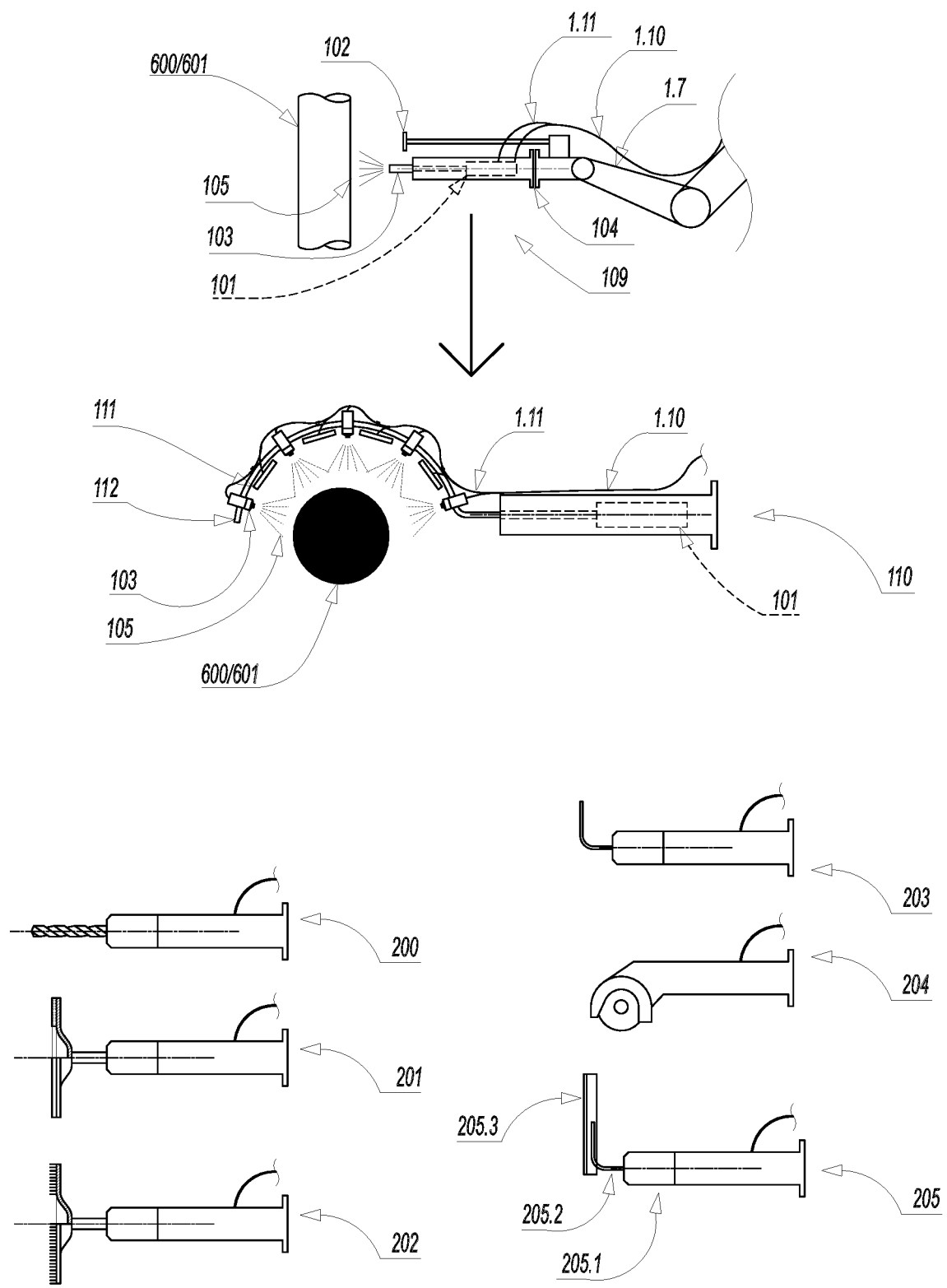
FIG. 20: illustrate a side view, of types of tools, devices of the following invention.

Referring to FIG. 20, shows a detail in side view, of a type of equipment performing a task on work, structures (600) or glass (601) and further down arrow a series of tools. Where, by way of illustration and not limitation of the tasks that can be performed and the tools that make up the following invention, UAM (1) has a spray effector (109) connected to the robot arm (1.7). This particular tool is capable of applying paint to complex surfaces work, structures (600), for this the robot arm (1.7) comprises a CCD camera matrix, a frontal camera (102), capable of collecting image data and understanding its environment.

The spray effector (109), at its end comprises a spray nozzle (103) from which expelled fluid (105) comes out, which has been led through hose (1.11) to the pump (101). The pump (101) and spray nozzle (103) are controlled by controller (1.4) capable of spraying.

Likewise, different types of tools are attached and connected. One that is capable of drilling, drill (200), mainly comprises a body that houses a motor and a cylindrical body that starts chips. Another that is capable of grinding, grinding machine (201), mainly comprises a body that houses a motor and an abrasive disc. Another that is capable of sweeping particles and small surpluses of material, sweeper (202), mainly comprises a body that houses a motor, a disk that has a series of filaments perpendicularly arranged to it, preferably dense and that has a conduit that sucks the particles and small surpluses.

Another capable of cutting and leveling grass, grass cutter (203), mainly comprises a body that houses a motor and a bent filament.

Another capable of sawing, circular saw cutter (204), mainly comprises a body that houses a motor and a disk that has a series of teeth that grind a body through continuous chip removal.

Another one capable of sweeping surfaces such as glass and rid of water, window cleaner (205), mainly comprises a body that houses a rotor (205.1) a filament bent in the manner of an "L", link support (205.2) of which an elongated laminar body is attached, plate (205.3), capable of rotating in relation to the axis of the link support (205.2).

Figure 21:
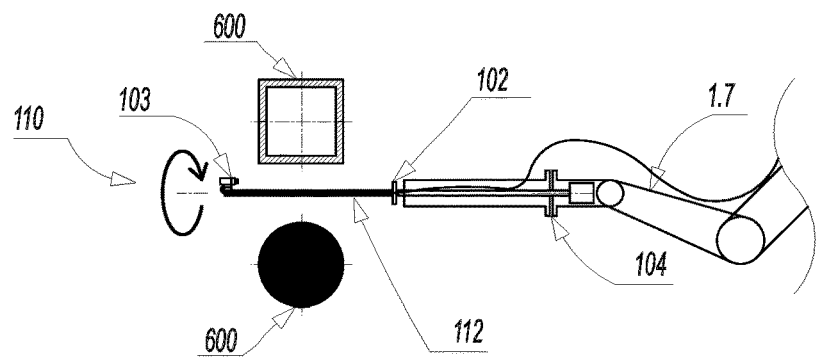
FIG. 21: illustrate a side view of the curved spray effector (110) being introduced into a narrow place.
Figure 22:
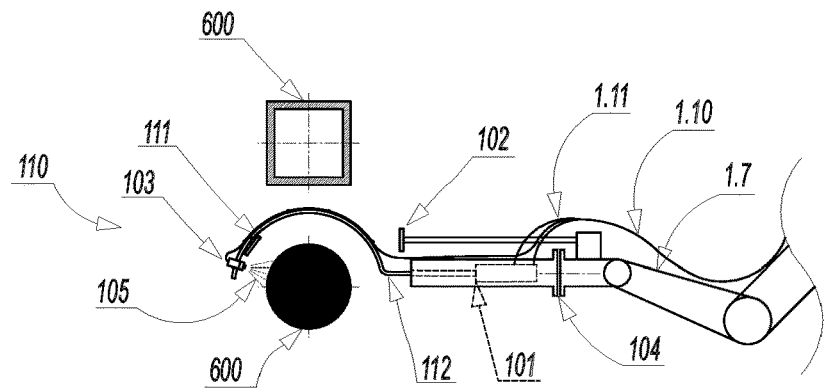
FIG. 22: illustrate a side view of the curved spray effector (110) painting in a narrow place.
Figure 23:
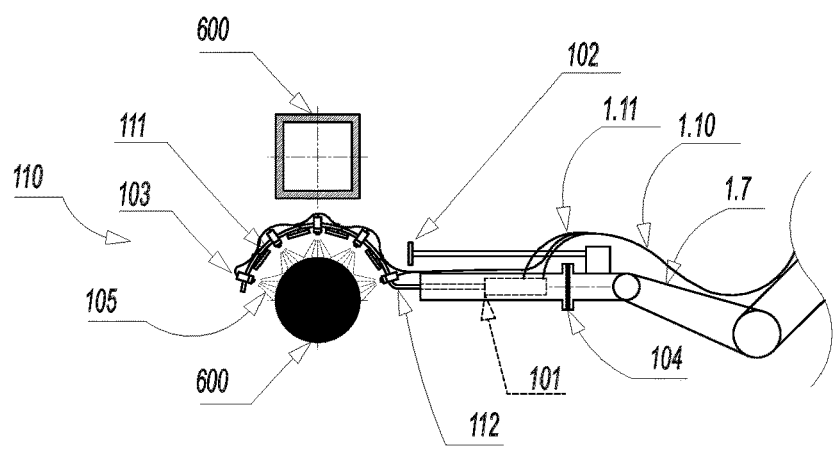
FIG. 23: illustrate a side view of the curved spray effector (110) with multi-nozzles painting in a narrow place.

Collectively, FIGS. 20, 21, 22 and 23, as far as the curved spray effector (110) is concerned, it can be seen as in FIG. 20, a general description is made, FIG. 21, it is shown how it turns to enter between two structures (600), while in FIG. 22, it is shown how he has entered the narrow place and in FIG. 23, he is exercising the task. The curved spray effector (110) description will be made, where Curved spray effector (110), at its end comprises at least one spray nozzle (103), conveniently distributed according to the task, which is arranged on a cylindrical body that has a curve preferably of a determined radius, support (112), which is joined with a larger body. Next to the spray nozzle (103), also on the support (112), there is a matrix of cameras, CCD camera (111). From the spray nozzle (103), expelled fluid (105) is illustrated, which has been led through the hose (1.11) to the pump (101). The pump (101) and spray nozzle (103) are controlled by the controller (1.4), capable of spraying. It also includes the necessary ducts, conduit (1.10), which allow power to be delivered to as many spray nozzles (103), camera (111) and pump (101) are required.

The number and distribution of spray nozzle (103) and camera (111) are defined by the task.

In particular, the rotation of the curved spray effector (110) is carried out by the wrist movement of the robot arm (1.7). Other necessary movements or possible extensions to achieve the task are perfectly solved by additional devices. Furthermore, the tools described are an example from the field of devices that can be attached to UAM. The control, power connection, wired or wireless drive, motor power and technical characteristics to achieve that this type of tools fulfill a certain task in relation to the requirements of the UAM (1), the work, structures (600), the mechanical technique allows today without much effort to achieve.

Figure 24:
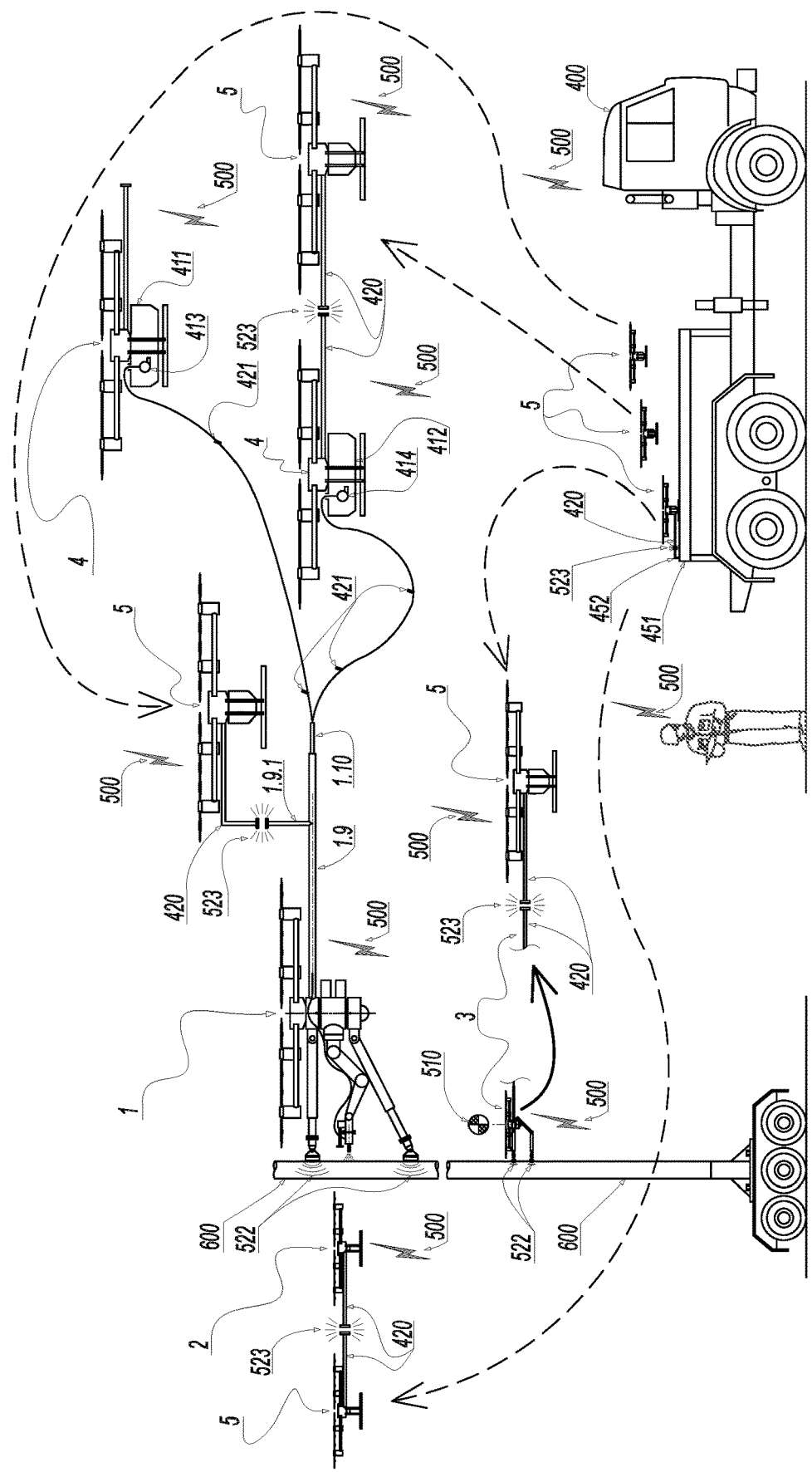
FIG. 24: illustrate a side view of the cable supply method and power supply by air contact. Where the UAM (1) is attached and is executing a task on the work, structures (600), the origin UAV (3) is attached to the site, structures (600), a supply UAV (4) is supplying continuously, and an inspector UAV (2) performs visual support and revision of the task to be executed, of the following invention. A charger UAV (5) get charge energy power from UGV (400).

Referring to FIG. 24, shows an illustrative diagram in side view of the aerial method of cable supply and contact power supply. Where the UAM (1) is attached and is executing a task on the work, structures (600), the origin UAV (3) is attached to the site, structures (600), the supply UAV (4) is continuously delivering supply, the inspector UAV (2) performs visual support and revision of the task to be executed, and the charger UAV (5) is delivering energy load power of the following invention.

At least one charger UAV (5) is then capable of supplying power load to the UAV of the equipment that continuously moves between them, transport UGV (400) and supply, for this the transport and supply UGV (400), It comprises of a platform where the UAV lands on a wired power platform (451), in such a close position that an automatic connection of two electromagnetic link cables occurs, an electromagnet (523), at the outer end of the flexible cable in the UAV, flexible duct (420), has a surface that is activated by this UAV capable of exerting, at convenience, an electromagnetic attraction such that the also flexible cable of the landing platform, flexible duct (452), which is achieved because this flexible cable at its end it comprises a metal plate of the ferrous type which attracts. Internally, it is produced by contact with known power energy contacts and the UAV is charged and/or recharged. Once the load has been carried out, the UAV disconnects the electromagnetic property and frees itself from the other flexible cable.

The position of the UAV equipment on the wired power platform (451) of the transport and supply UGV (400) is achieved since it has visual means, graphic marks, lights, color patterns or defined shapes that the UAV identifies.

The electromagnetic link is achieved since the controller (1.4) sends a signal and electrical impulse to the coil that makes up the electromagnet at the end of the cable, with which the end of the other cable that has the ferrous body is attracted in this condition. Line up the internal contacts that allow the passage of power energy.

The delivery of power energy from the battery (not shown) in the transport and supply UGV (400), is carried out because the UAV is positioned and with it the platform by means of a pressure or infrared sensor, as the equipment lands, it is activated and transferred via load energy power supply management (not shown).

Likewise, in the air the recharge of energy by electromagnetic link contact, an electromagnet (523), between the supply UAV (4) and the charger UAV (5) since the supply UAV (4) from its main body is projected with flexible duct (420) and is produced connection with the end of the flexible duct (420) of the charger UAV (5).

Likewise, in UAM (1) the contact energy recharge performed in flight, link (523), since the UAM (1) in support duct (1.9) has a guide bifurcation, support duct (1.9.1), which has at its end a terminal capable of reaching the end of the flexible duct (420) of the charger UAV (5).

To obtain corresponding positions in the air and achieve contact, UAVs extend beyond the maximum capable radius of the rotors. Inside the perimeter of the rotors, the flexible duct (420) is rather rigid, and further outside it, it is flexible.

The length of flexible conduit 420 is such as to absorb small turbulence distances and flight timing dissonances.

The electromagnet has such a force that it is released according to a determined separation force produced by one of the UAVs, this ensures that in the event of possible bad maneuvers or turbulence between them, the contact terminals are released without generating danger of pushing one on the other and they move to get entangled with conduit (1.10) or collide with a construction structure (600), and on the contrary it is ensured that there is no attraction between them causing collision.

UAVs have constant communication of emission of first signals and response of second signals, wireless transmission (500), transmitting information from sensor means, global position and distance between them, which is capable of achieving flight synchronization, such that it allows to maintain an adequate position for the transmission of energy by contact.

In other embodiments the contact connection is simply by magnet, on the end face the cable of a UAV and on the other a ferrous metal plate. With the simple fact of approaching, they attract and to release a certain force exerted by the displacement of the UAVs.

In all cases, it should be considered that the charger UAVs (5) are obviously lighter due to their requirements. To understand illustratively, its performance after carrying out power charging, where its determined battery (not shown) is charged, can go from the transport and supply UGV (400) to reach a UAV to spend 20% of energy, in the load air itself spend 10% of energy and in the return to re-charge 20% of energy, with which it can make effective charge of its 50%. UAM (1) makes higher energy requirements, because if a charger UAV (5) provides only 25%, it relies on how many recharges are necessary in flight to make its work continuous. UAVs are charged by a charger UAV (5) after another charger UAV (5) and so on, and continuously as required.

Collectively, FIGS. 24, 25, 26 and 28 contemplates the method to obtain position and monitor supply cables between the UAVs of the equipment, centralised mobile reel unit (700) and transport or supply UGV (400), from hoses and cables (418) comprises along it, a coupled torus of revolution body, ring (421), which is distributed evenly as many times as required by the length, hoses and cables (418). Ring (421) is fed by load energy power, with a cable line parallel to hoses and cables (418) supplying it. The ring (421) has in its interior radio transmitter that emits signals to the UAV equipment, the Software (1009), processes the position as points in coordinate space, with which the cable can be constantly monitored and decisions are made of proximity with respect to the equipment, nearby structures and maneuvers that are carried out. A curve can be synthesized by three points in space, the more, ring (421), are arranged along the hoses and cables (418), the greater the precision of the plot. In this way the cable is free from entanglement and risky maneuvers for UAV equipment, the environment and tasks, and even collisions.

Software (1009) with cross information; of the environment, surrounding structures, radius of curvature of characteristics and properties of the cables involved, fluid that is transmitted, and the relative positions of the UAV of the equipment, predicts and shows fields of risk, and warns of positions out of danger. Therefore, it is able to predict safe routes.

Figure 25:
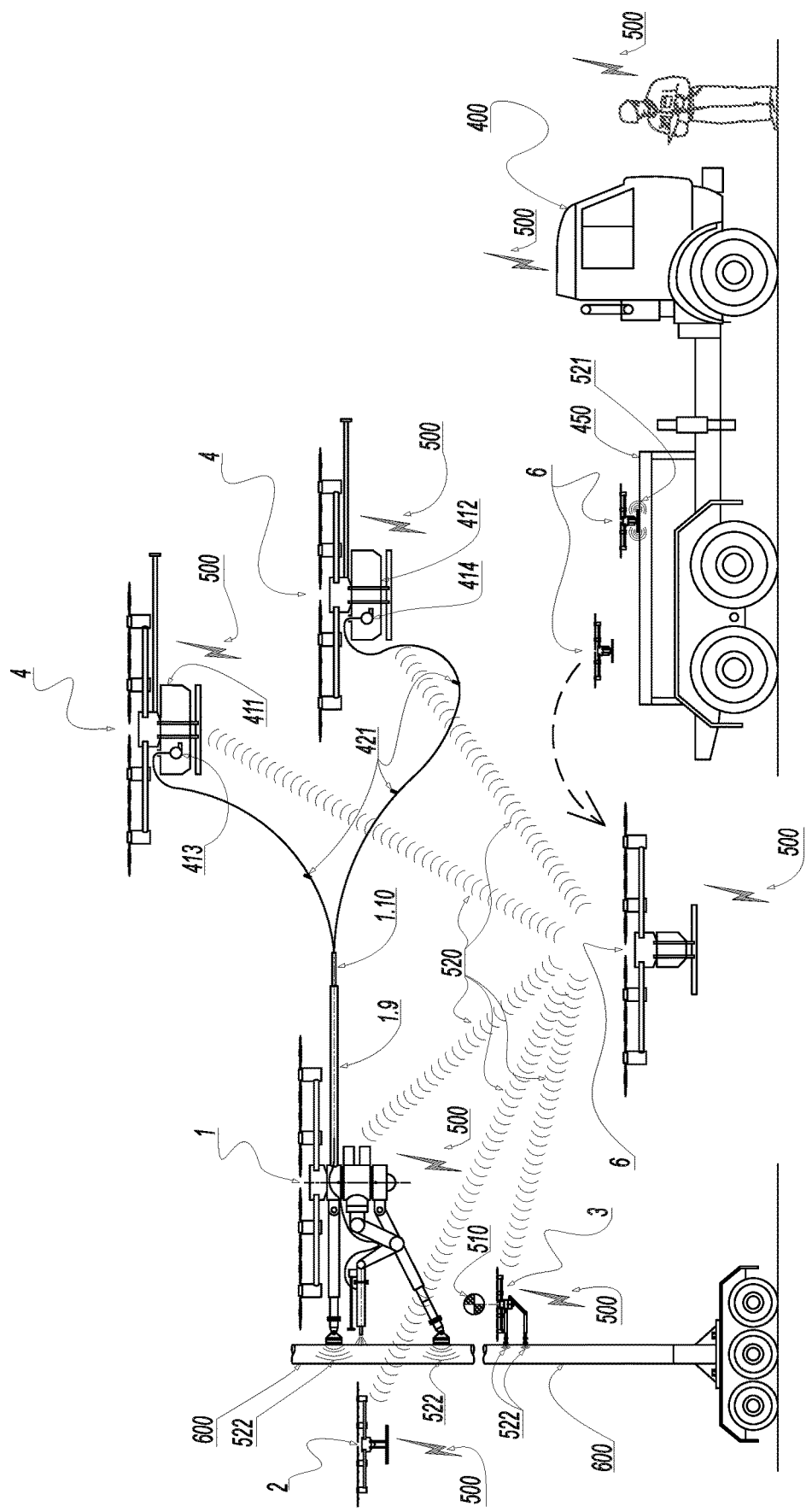
FIG. 25: illustrate a side view of the method of cable supply and delivery of overhead wireless power. Where the UAM (1) is attached and is executing a task on the work, structures (600), the origin UAV (3) is attached to the site, structures (600), the supply UAV (4) is supplying continuously, and the inspector UAV (2) performs visual support and revision of the task to be executed, of the following invention. The charger UAV (6) get charge energy power from UGV (400).

Referring to FIG. 25, shows an illustrative diagram in side view of the aerial method of cable supply and wireless power supply. Where the UAM (1) is attached and is executing a task on the work, structures (600), the origin UAV (3) is attached to the site, structures (600), the supply UAV (4) is continuously delivering supply, the inspector UAV (2) performs visual support and revision of the task to be executed, and the charger UAV (6), of the following invention.

At least one charger UAV (6) is then capable of supplying power wirelessly to the UAV of the equipment, which continuously moves between them and the UGV (400), for this the UGV (400) comprises a platform where the UAV it lands, power induction platform (450), on and in a position such and close that a link induction occurs, linking (521).

Likewise, in flight, at least one charger UAV (6) delivers via radio frequency, linking (520), induction charges energy to the other UAV.

UAVs have their own energy requirements, since UAM (1) has subsystems that require more energy, therefore it requires a higher frequency of re-charging in flight. In all cases, it should be considered that UAV, the charger UAV (6) are obviously lighter due to their requirements. To understand illustratively, its performance after charging power, where its determined battery (not shown) is charged, can go from the UGV (400) to reach a UAV to spend 20% of energy, in the air cargo itself. 10% of energy and in the return to re-charge 20% of energy, with which it can make an effective charge of its 50%. UAM (1) makes higher energy requirements, because if a charger UAV (6) provides only 25%, it relies on how many recharges are necessary in flight to make its work continuous. UAVs are charged by a charger UAV (6) after another charger UAV (6) and so on, and continuously as required.

The position of the UAV equipment on the power induction platform (450) of the UGV (400) is achieved since it has visual means, graphic marks, lights, color patterns or defined shapes that the UAV identifies.

Power transmission based on electromagnetic induction corresponds to power transmission between a primary coil and a secondary coil. A magnet moves around a coil, generating an induced current. So a transmitter generates a magnetic field, and a current is induced in a receiver due to a change in the magnetic field, creating energy.

The delivery of power energy from the battery (not shown) in the UGV (400), is carried out because the UAV is positioned and with it the platform through a pressure or infrared sensor, as the equipment lands, it is activated and transferred through supply management charging energy power (not shown).

Referring to FIGS. 24 and 25, can also be seen that the supply load to UAM (1) is carried out in flight by at least one supply UAV (4). Shown here, two supply UAVs (4), each one can deliver a different supply, one supply UAV (4) comprises, reservoir (411), and pump (413), while the other supply UAV (4) comprises another, reservoir (412), and another, pump (414). This parallel arrangement enables equally parallel tasks to be carried out. In some embodiments there are 2 robot arms (1.7), in one additive fluids are delivered and in the other subtractive fluids are delivered. Also in a robot arm (1.7) additive fluids and subtractive fluids are delivered, depending on the task.

Figure 26:
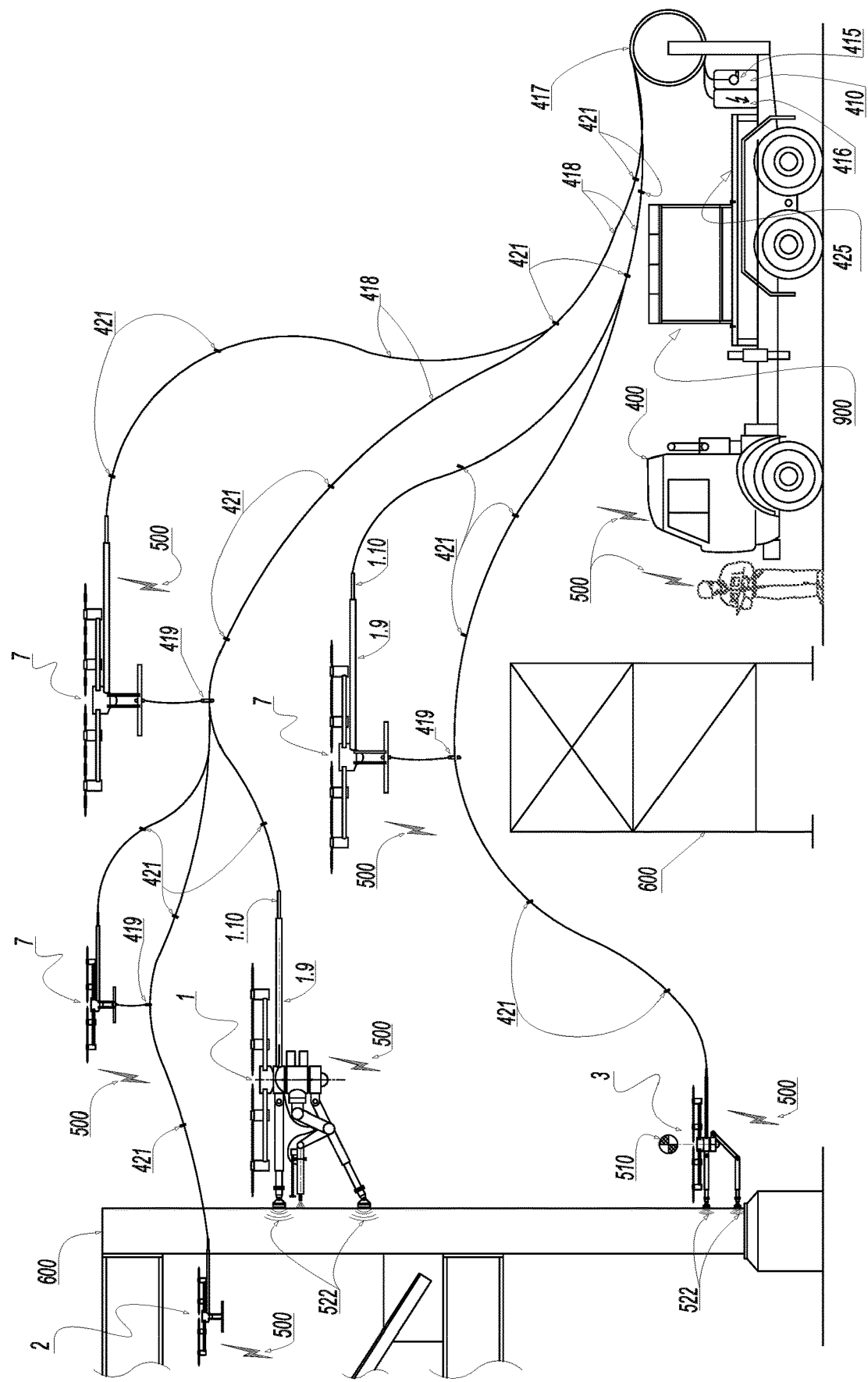
FIG. 26: illustrate a side view of the cable supply method and power supply also by cable. Where the UAM (1) is attached and is executing a task on the work, structures (600), the origin UAV (3) is attached to the site, structures (600), the supply UAV (4) is supplying continuously, and the inspector UAV (2) performs visual support and revision of the task to be executed, of the following invention. UGV (400) delivers supplies continuously.

Referring to FIG. 26, shows an illustrative diagram in side view, of the method of supply by cable and supply load wire power from the ground. Where the UAM (1) is attached and is executing a task on the work, structures (600), the origin UAV (3) is attached to the site, structures (600), the inspector UAV (2) performs visual support and review of the task to be executed, and UAV (7), of the following invention.

At least for each UAV, one UAV (7) is then capable of supplying load power to the inspector UAV (2) and the origin UAV (3), from the UGV (400) through hoses and cables (418).

Also, at least one UAV (7) is capable of delivering fluid supply and supplying load energy power for each UAM (1), from UGV (400) through hoses and cables (418).

The UAV (7) is capable of delivering fluid supply and supplying charge energy power because it comprises a hoses and hoses and cables (418), from a UGV (400), which comprises a reel unit (417) that is capable of delivering as far as required the necessary cables. It also comprises a reservoir (410), in which a pump (415) drives or sucks the fluid, additive fluids or subtractive fluids, depending on the task. In addition, it includes a power unit (416), capable of delivering UAV.

The UAV (7) is also connected to hoses and cables (418) by means of a branch. Said joint respects the support duct (1.9), the conduit (1.10), the free fall and constitution of the hoses and cables (418) and the various pressures that are characteristic of the fluid.

This UAV supports the hoses and cables (418) by means of a ring that is connected and from which it is connected to the landing gear, hose and cable support (419).

To carry out the detailed description of another preferred embodiment of the device of the invention, continuous reference will be made to the FIGS. of the drawings, of which FIGS. 27, 28, 29 and 30, centralized mobile reel unit (700) that is installed on a work under construction or a building work already completed, work that can be fixed or in motion, where the supply to UAV is from this. To exemplify a particular task reference is made to a supply in wired form. A glazed building (602) has been installed centralized mobile reel unit (700) previously transported by UGV (424). UAM (1) is attached to a glazed building (602) which includes a suction cup (1.5.100) in attachment (1.5) and in lower attachment (1.6), in addition, the robot arm (1.7) has a window cleaner (205) connected. With which he is capable, within one of the tasks is to clean glass in a glazed building, periodically. Where UGV (424) is a vehicle driven by an operator or an autonomous vehicle.

UAM (1) is supported by a cable organizer UAV (8) which is capable of ordering supply cables. These UAVs are stored and recharged in a station (900) that is also previously installed on a glazed building (602) per UGV (424). The cable organizer UAV (8) is recharged by induction.

Figure 27:
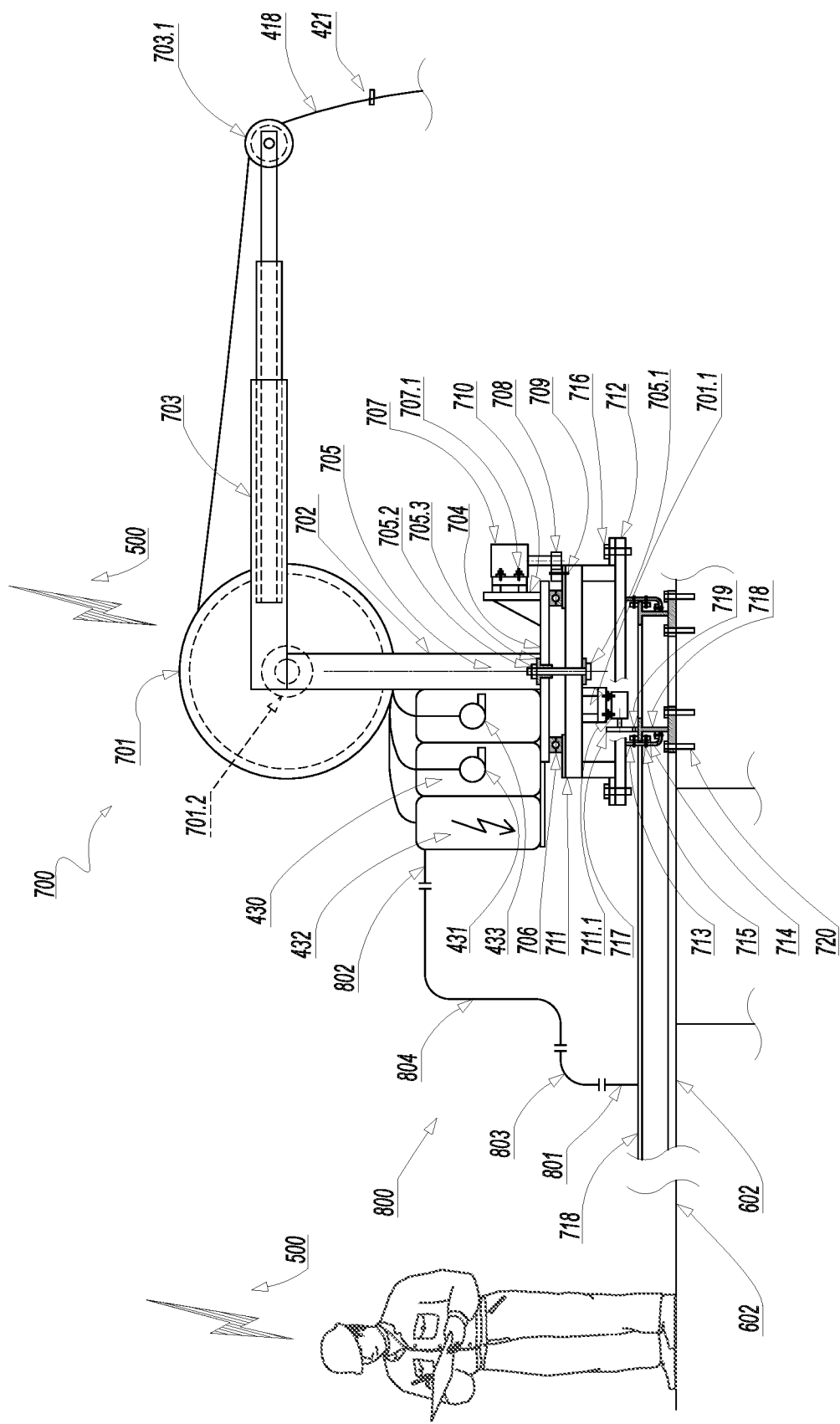
FIG. 27: illustrate a partial side view of a centralized mobile reel unit (700) of the following invention.

Referring to FIG. 27, is a side view illustrating a centralized mobile reel unit (700) that is installed on a construction site or a construction site already completed, a site that may be fixed or in motion. The centralized mobile reel unit (700) allows cable to be delivered to a UAV for this, it comprises a cylindrical body that is limited on its larger faces by two larger disks, reel (701), in whose cylindrical body the hoses and cables (418) is previously wound, from the center of the reel (701), rectangular section bodies that contain other bodies of similar section that extend towards the front, a telescopic arm (703), at whose end an pulley (703.1) allows directing down, the hoses and cables (418).

Aligned and concentric to the reel (701), there is a motor (701.2), which allows according to the UAV requires hoses and cables (418), motor power to advance and collect, driven by controller (701.1), which is in communication, wireless transmission (500), to UAV, control station (1001), and/or remotely controlled (1012).

On a circular body, swivel bracket (704), a reservoir (430) is extended and located, which contains, by way of example; paint or water with glass cleaning emulsion, inside which there is a pump (431). Similarly, another tank contains a suction pump (433), for example sucking air. In turn, an energy storage device is provided, electric power accumulator (432), in case of supply cut-off.

Reel (701) is at a certain height that is supported by the reel support (702), which is attached to a circular body, swivel bracket (704). The latter, in its center, has a hole whose upper face houses the bushing (705.3). Lower down there is a rectangular base body, chassis (711) that also has a perforation. Then a cylindrical body with a larger threaded cylindrical body, shaft (705.1) arranged in the lower end of the chassis (711) is aligned with the bore of the swivel bracket (704), where further the upper face of the bushing (705.3) is it houses the nut (705.2) that joins them. Between swivel bracket (704) and chassis (711) there is radially distributed bearing (706) and bearing (706.1).

Integrated to the swivel bracket (704), a vertical laminar body, support (710), supports and connects a driving means arranged vertically in a downward direction, motor (707) at whose end is housed, gear (708). On the other hand, solidarity and concentric to the chassis (711), there is a gear rack (709). Then, when the motor (707) is driven, the base rotates and with it all the upper components, obviously, the reel (701), thereby giving the hoses and cables (418) horizontal orientation.

Under chassis (711) is located, a motorized structure (712), which joins them, bolted connection (716). The motorized structure (712) is attached to a bent plate in its lower part towards the inside of the equipment, link (713). In the glazed building (602) there is a rail (718), whose section is preferably in the form of an "H" turned horizontally which is connected by means of the anchor bolt (720). To link (713), cylindrical bodies are connected, drive rollers (714), by means of elongated coaxial cylindrical bodies, bolted connection (715). On rail (718) in a continuous way, gear rack (719). Inside and under the chassis (711) there is an inverted and horizontal motor (711.1) where it connects with a gear (717).

Gear (717) and gear rack (719) are aligned, then, when the motor (711.1) is driven, the chassis (711) and the reel (701), that is, all the equipment is set in motion on the rail (718).

In a glazed building (602), for the centralized mobile reel unit (700) to obtain sufficient supplies, it is connected to its own supply lines that the glazed building (602) has, since it includes a supply line (801) of pipes belonging to a rotatable, swivel fitting (803), a flexible hose pipe (804) and a swivel fitting (802) that connects to a reservoir (430) and electric power accumulator (432).

This supply line (800) has flexibility and lengths, in relation to the span of the glazed building (602) and of the rail (718) circuit.

The spans of the reservoir (430) and electric power accumulator (432) tanks are given by the requirements of the type of additive fluids or subtractive fluids, the periodicity with which UAV teams are required to carry out the task and the surface, size and span glazed building (602).

Figure 28:
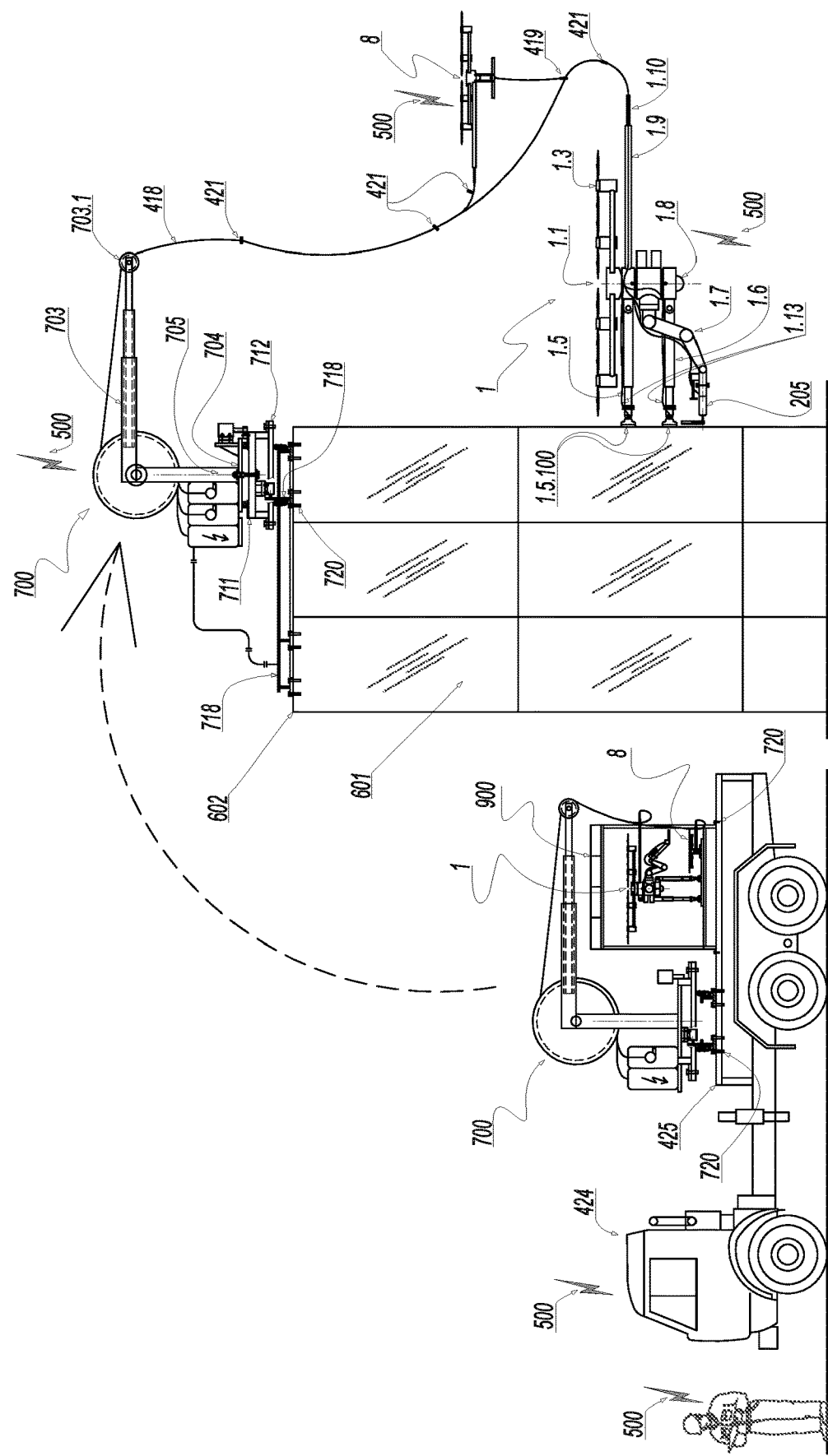
FIG. 28: illustrate a partial side view, method of cable supply and power supply also by cable, of a centralized mobile reel unit (700) installed on a glazed building (602).

Referring to FIG. 28, side view in which UGV (424) can be seen, which transports centralized unit mobile reel (700) and UAVs, in the same way transports station (900). UGV (424) comprises and is integral with this support (425), in a transport vehicle, which is connected to a centralized mobile reel unit (700).

The UAM (1) is attached to glass (601) by means of a suction cup (1.5.100) whose sucked air is transferred through the duct (1.13) by an air suction pump located on a centralised mobile reel unit (700). If the configuration and the application require it, an air suction pump can be located in the UAM (1), close to the suction cup (1.5.100), or in a support UAV.

Although FIGS. 24, 25, 26 and 28 is true, it is particularly illustrated that UAVs have a power supply that charges from a platform by induction or by contact wiring and easy connection, it is also illustrated that a vehicle provides them directly wired, however, in other embodiments UAVs can be provided by other techniques such as solar panel power. That is, both UAVs and supplies on the ground, vehicles or facilities may have other sources of power charging. In other embodiments, UAVs also include connection to solar panels, which allows for more autonomy to the equipment in flight.

Figure 29:
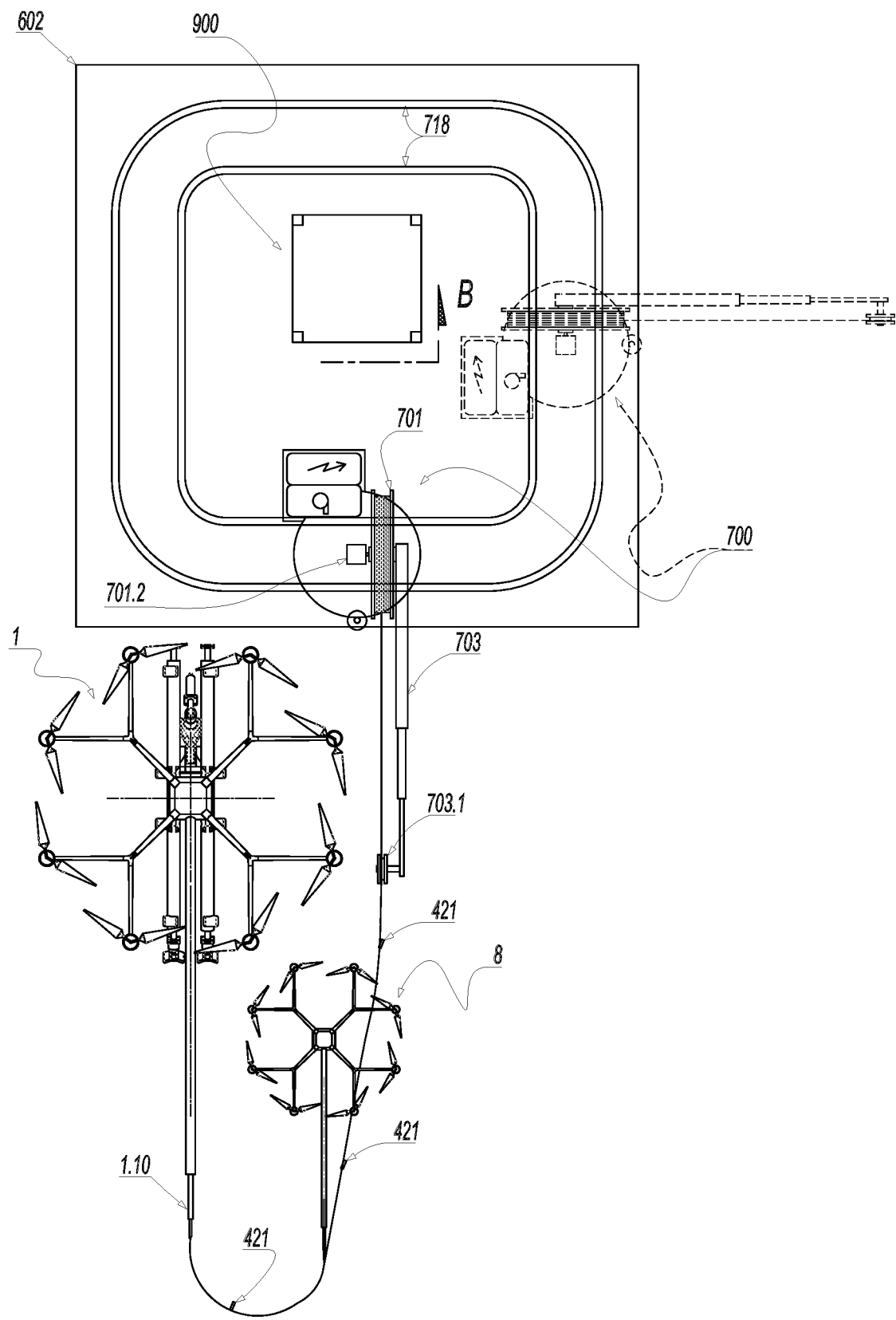
FIG. 29: illustrate a top view, cable supply method and power supply also by cable, of a centralised mobile reel unit (700) installed on a glazed building (602).

Referring to FIG. 29, is a top view and it can be seen that the rail (718) is rectangular with the proper radii to allow the rotation of the centralized mobile reel unit (700). The glazed building (602) is a simplified scheme of the work, so the path of the rail depends on the type of work. So, there are so many shapes of rails and geometries, in addition horizontal rail (718) is illustrated here and it is also built with height, that is, I highlight since it is necessary to deviate due to change in height of a certain obstacle of the work, equipment, architecture, etc.

Figure 30:
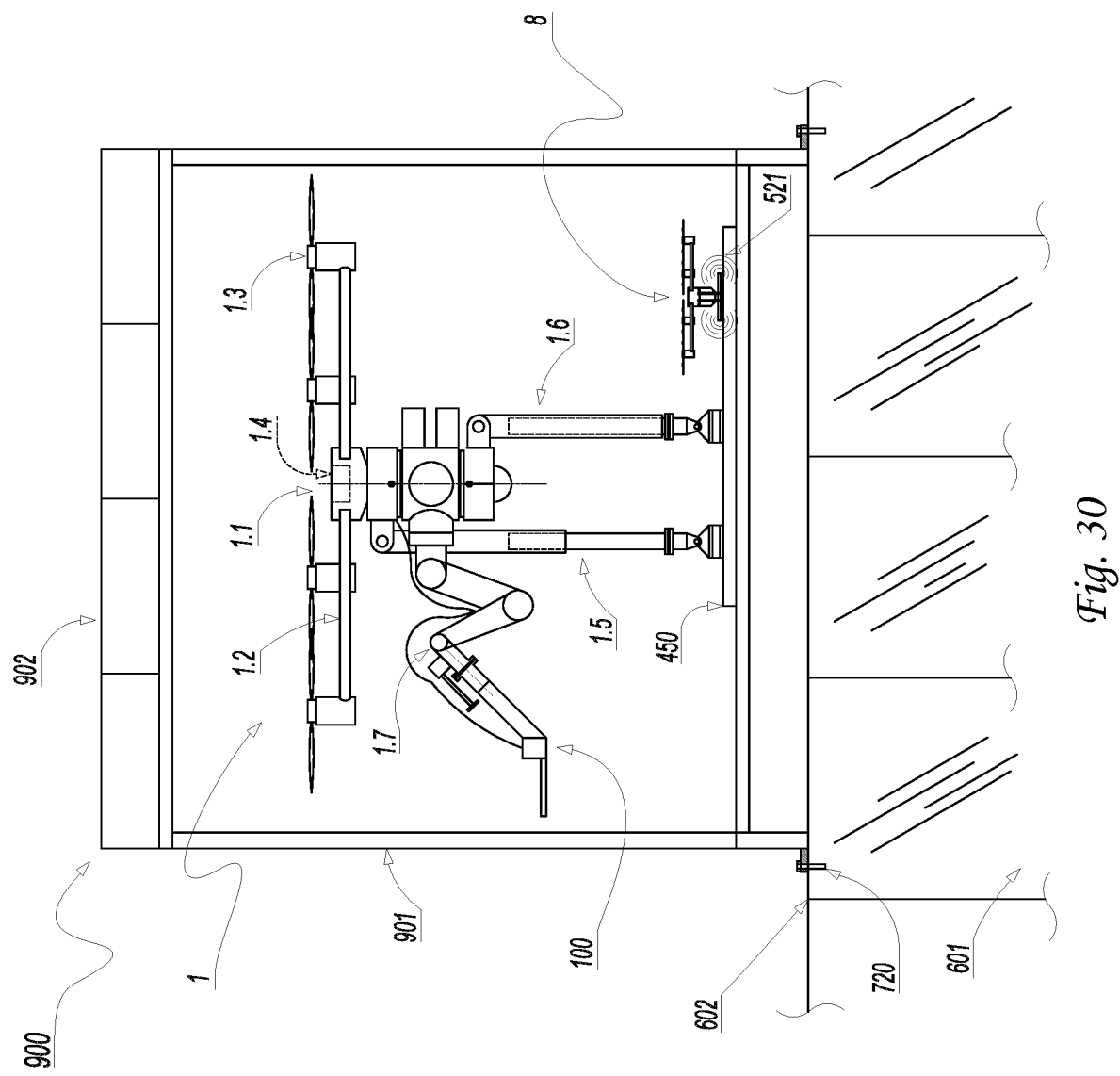
FIG. 30: illustrate a front view of section "B" of the previous figure, station (900) on a glazed building (602).

Referring to FIG. 30, is a front view of section "B" and it can be seen that the station (900) is installed on a glazed building (602), in which the UAVs are stored. Where station (900) is connected by anchor bolt (720) to tile or structural element of glazed building (602). The station (900) comprises four pillars in the corners and some crossbars both at its base and on its roof, structure (901), at the base of which there is a power induction platform (450) with which the UAVs are capable of charging power. On the station (900) there is a solar panel (902) that allows to obtain and then deliver power, autonomous from the glazed building (602), likewise, additional power energy in case of interruption of the supply of contingencies by glazed building (602).

Collectively, FIGS. 27, 28, 29 and 30, as has been said is an example of a particular and illustrative application of the task to be carried out, so it should not be limited that the station (900) has an power induction platform (450), since the cable organizer UAV (8) charges power energy through induction, because if another type of UAV that makes up the present invention is used, a wired power platform (451) or a platform without energy must be used since the supply it is delivered by hoses and cables (418).

Those skilled in the art will understand that the foregoing refers only to a preferred embodiment of the invention, the description of which focuses on the core of the system, methods and devices, for which there are a series of details not shown and certainly omitted that the mechanical, electronic and computer technology, allows today without much effort to achieve, are normal engineering problems that are well known to those of skill in the art, and will not be explained in more detail here.

Those skilled in the art will further understand that the foregoing refers only to a preferred embodiment of the invention, which is susceptible to modifications without implying a departure from the scope of the invention, defined by the claims that follow.

The invention claimed is:

1. A system to carry out a multiplicity of complex tasks possible on sites, by means of autonomous unmanned aerial vehicles (UAVs), the system including:
a) at least one Autonomous Unmanned aerial vehicle for Multiple tasks (UAM), comprising:
at least one robot arm with several degrees of freedom and specially configured with functional and operational tools to execute at least one specific assigned and predefined task, of multiple possible tasks on a worksite,
at least one upper fixing attachment;
and at least one lower fixing attachment;
wherein the at least one upper and lower fixing attachments are configured to attach the at least one UAM to a structure of the worksite to allow precision and stability while executing the at least one specific assigned and predefined task;
b) at least one control station that operates the system to control the at least one UAM, by means of command signals in communication and coordination with multiple UAVs,
wherein an Inspector UAV is configured to supervise and inspect tasks executed by the at least one UAM;
wherein an Origin UAV is configured to be attached to the structure during the tasks executed by the at least one UAM, to sense and scan the worksite and communicate data to the at least one control station;
where a Supply UAV is configured to supply or extract fluids in flight, through supply cables or hoses to effectors of the at least one robot arm;
wherein a Charger UAV is configured to deliver power load in flight; and
wherein a Cable Organizer UAV is configured to keep cables and the hoses suspended in the air;
c) the supply cables or the hoses to supply fluids from a centralised mobile reel unit that includes a reel unit that distributes the hoses and the cables in response to maneuvers in flight, wherein such centralised mobile reel unit can be located on the ground, in the air, nearby or installed onsite;
d) a plurality of sensor rings that are arranged equidistant and homogeneously along the hoses and the cables, wherein each sensor ring is configured to monitor its position and movement, and to output signals to the at least one control station;
e) wherein the at least one control station is configured for flight maneuvers, communication, monitoring, task operation and control of the system; and
f) a Wi Fi link, which allows data to be sent to a cloud and improves operations through artificial intelligence.

2. The system according to claim 1, wherein the at least one robot arm comprises an omnidirectional video camera.

3. The system according to claim 1, wherein the at least one robot arm comprises a LIDAR system.

4. The system according to claim 1, wherein the at least one robot arm comprises a fluid pump configured to supply paint that is delivered by means of a curved spray effector, wherein an end of the curved spray effector comprises at least one spray nozzle distributed over a cylindrical body that has a curve of a determined radius that connects with the at least one robot arm and that disposes a camera.

5. The system according to claim 1, wherein the fluid supplied or extracted by the Supply UAV is paint or air from a spray nozzle.

6. The system according to claim 1, wherein the Charger UAV delivers the power load in flight to the multiple UAVs and to the at least one UAM through an electrical cable, through a magnetic contact.

7. The system according to claim 1, wherein the Charger UAV delivers the power load in flight to the multiple UAVs and to the at least one UAM by induction.

8. The system according to claim 1, wherein the at least one UAM the Inspector UAV, the Origin UAV and the Cable Organizer UAV receive energy through an electrical cable, being connected to the centralised mobile reel unit.

9. The system according to claim 1, wherein the centralised mobile reel unit is configured to deliver or remove the hoses and the cables to the at least one UAM, the Inspector UAV, the Origin UAV and the Cable Organizer UAV.

10. The system according to claim 1, wherein the at least one robot arm, the at least one upper fixing attachment and the at least one lower fixing attachment extend from a circular body of the at least one UAM, wherein each of the at least one robot arm, at least one upper fixing attachment and at least one lower fixing attachment comprise base bodies capable of independently rotating around an axis, said base bodies forming the circular body of the at least one UAM.

11. The system according to claim 10, wherein the base body of the at least one robot arm is coupled to a rotor, which transmits power by means of gears to ring gears that are integral with the base body of the at least one upper fixing attachment and of the at least one lower fixing attachment.

12. The system according to claim 1, wherein the at least one upper fixing attachment and/or the at least one lower fixing attachment comprise: an electromagnetic plate, a suction cup, a press fixing attachment and/or a lever-press fixing attachment.

13. The system according to claim 12, wherein the lever-press fixing attachment comprises: an upper extension, an upper stop, a lower extension, and a lower stop.

14. The system according to claim 12, wherein the press fixing attachment comprises: a first support having a threaded hole; an upper extension having a threaded cylinder; and a second support coupled to an end of the upper extension, wherein the first and second supports comprise non-stick surfaces.

* * * * *